(12) United States Patent
Nishikawa

(10) Patent No.: US 6,775,374 B2
(45) Date of Patent: Aug. 10, 2004

(54) NETWORK DEVICE CONTROL SYSTEM, NETWORK INTERCONNECTION APPARATUS AND NETWORK DEVICE

(75) Inventor: Youichiro Nishikawa, Katano (JP)

(73) Assignee: Sanyo Electric Co., Ltd., Osaka (JP)

(*) Notice: Subject to any disclaimer, the term of this patent is extended or adjusted under 35 U.S.C. 154(b) by 117 days.

(21) Appl. No.: 10/233,081

(22) Filed: Aug. 30, 2002

(65) Prior Publication Data

US 2003/0058843 A1 Mar. 27, 2003

(30) Foreign Application Priority Data

Sep. 25, 2001 (JP) ........................................ 2001-292506
Sep. 25, 2001 (JP) ........................................ 2001-292610

(51) Int. Cl.[7] ............................................. H04M 11/01
(52) U.S. Cl. ............................ 379/221.01; 379/102.03; 713/201; 713/310
(58) Field of Search ....................... 379/102.01, 102.02, 379/102.03, 102.05; 713/201, 310

(56) References Cited

U.S. PATENT DOCUMENTS 6,421,782 B1 * 7/2002 Yanagisawa et al. ....... 713/201
6,425,040 B1 * 7/2002 Dewa et al. ................. 710/303

FOREIGN PATENT DOCUMENTS

| JP | 10-210068 | 8/1998 |
|----|-----------|--------|
| JP | 10-307766 | 11/1998 |
| JP | 2000-69150 | 3/2000 |
| WO | WO 01/010103 | 2/2001 |

* cited by examiner

Primary Examiner—Creighton Smith
(74) Attorney, Agent, or Firm—Darby & Darby

(57) ABSTRACT

A network device included in a local area network is controlled with an outside telephone. A telephone line 2 is directly connected to a router 3 incorporated in a local area network 7 including a computer 8. A server 5 is connected to the telephone line 2, and the telephone line 2 is also used as the Internet 9. The outside telephone 4 makes a call to the router 3 through the telephone line 2 while the router 3 detects the phone call to send a packet for activation to the computer 8 to activate the device in the wait state. The computer 8 after the activation requests the server 5 to allow its connection to the Internet 9, obtains a network address in the Internet 9, and notifies the network address to the outside telephone 4. Thereafter, data is exchanged between the telephone 4 and the computer 8.

26 Claims, 13 Drawing Sheets

NETWORK DEVICE CONTROL SYSTEM, NETWORK INTERCONNECTION APPARATUS AND NETWORK DEVICE

BACKGROUND OF THE INVENTION

1. Field of the Invention

The present invention relates to a network device control system, a network interconnection apparatus and a network device wherein the network device is activated and each kind of control is performed by making a telephone call from an outside communications apparatus via a telephone line to a network interconnection apparatus connected to a local area network including a network device, or to a network device connected to a telephone line.

2. Description of Related Art

Network systems have become common in recent years wherein a router which is a network interconnection apparatus is connected to a terminal of a LAN (Local Area Network) which is an example of a local area network built in a fixed area, thereby connecting the LAN to a WAN (Wide Area Network) which is an example of another local area network of an outside wide area via this router. Furthermore, in general, a server of a network provider which controls the WAN and the like is connected to the WAN while the network device included in the LAN is also connected to the WAN by accessing the server.

Furthermore, in recent years, attention has been paid to a so-called home network in which a local area network such as a LAN is built in homes. The home network is built in such a manner that an information device such as a computer, an electronic device or the like located in a home is connected to the home network as a network device thereby allowing one device to be controlled from another device or allowing mutual exchange of data between devices while allowing each of the devices to be connected to the WAN.

Among means for controlling one device from another device in the LAN as described above, there is means which activates one device in the wait state (sleep state) by another device. This is realized by sending a special packet called a magic packet which corresponds to a WOL (Wake On LAN) technology, from one device to another through the LAN.

In addition to the control or the like performed between devices in the LAN described above, it has become increasingly desired that each device in the LAN is controlled from the outside by making use of an outside WAN such as the Internet or the like.

However, in a case where a device in the LAN is accessed through the WAN from the outside, a logical network is not given for identifying the location of the device based on the WAN by a server which manages the WAN unless the WAN is not accessed from another device in the LAN, resulting in a problem in that the location to be accessed by the device cannot be identified from outside the LAN and access itself is not allowed. That is, the logical network address of the device in the WAN is given only when the device is connected to the WAN, so that no means is provided for obtaining in advance the logical network address, which disables the access.

Furthermore, there is another problem in that though the LAN and the WAN are connected via a router, a global address which is a logical network address based on the WAN, and a local address which is a logical network address based on the LAN exist independently from each other.

The global address of the device included in the WAN can be identified by the network provider which manages the WAN. However, since the local address of each device included in the LAN is given by the router, the local address cannot be identified by the network provider. As a consequence, there is a problem in that the local address ahead of the router cannot be judged from the outside and access cannot be made to the device in the LAN from the outside via the router.

On the other hand, there arises a desire that each of the devices included in the LAN be controlled from a portable type or an installed type telephone which is an outside communications apparatus. In a case where the telephone has a connection function such as the Internet or the like, the telephone can be connected to the WAN or the like using the Internet connection function or the like. However, there is a problem in that even when an attempt is made to activate a device using the WOL (Wake On LAN) technology, a magic packet corresponding to the WOL technology cannot be sent from the telephone, so that the device cannot be activated. Furthermore, when the device cannot be activated, operations of the device cannot be fundamentally controlled. In order to avoid such a state, the device must be set in an activated state at all times, resulting in a prohibitive cost required for the wait power and the like and for system management, which is not realistic.

Furthermore, it is assumed that the telephone is connected to the LAN through a telephone line. However, there is a problem in that when the router connected to the LAN is a network router, the router has no connection port of the telephone line and cannot be connected to the telephone line, and the telephone cannot be connected to the LAN through the telephone line.

Furthermore, in recent years, there are various kinds of electronic devices such as a video apparatus or an air conditioner which are connected to a telephone line to enable activation and operation by making a telephone call from an outside telephone or the like. This kind of electronic device receives a signal inputted from a telephone after setting the telephone line in the connected state upon receipt of a telephone call, and thereby activation and each function are operated on the basis of the content of this received signal.

Herein, a specific explanation is given of a video apparatus. First, a telephone call is made to a specific line to which a video apparatus is connected from an outside telephone to set a telephone line in a connected state between the video apparatus and the telephone. Next, a signal is sent from the telephone in accordance with activation and operation procedures defined for the video apparatus. For example, to set the video apparatus from the wait state to the activation state, symbols "1" and "#" are inputted in sequence through the telephone to send a signal of the input content via the line which is in the connection state. Furthermore, to set a time controlled image recording, symbols "2" and "#" are inputted one after another to set the video apparatus to a recording mode. In the case where the video apparatus performs a recording operation for one hour from 11AM, symbols "1", "1", "#", "1" and "#" are inputted one after another thereby enabling activation and operation of the video apparatus from the outside.

The above-mentioned line connection type electronic device is often used in general households. In general households, in most cases, a contract is normally made for a single line in response to one telephone. In the case of a single line contract, an electronic device is connected to the single line together with a telephone and facsimile machine. Consequently, when a telephone call is made from an outside telephone to a single line to which the electronic device is connected, there arises a problem in that the telephone call cannot be differentiated as to whether the telephone call is directed to the telephone or directed to the electronic device within the household. Furthermore, in the case where an answering machine function is attached to the telephone, the answering machine function is operated in advance by the telephone call directed to the electronic device, resulting in connection failure to the electronic device.

With respect to the above-mentioned problem, a system is proposed wherein a special function is provided for the outside telephone to enable sending a specific password signal while for the telephone or the like within the household a function is provided which enables giving priority to receiving addresses, so that connection of incoming calls directed to a household is differentiated through a monitoring of the above-mentioned password signal. However, there is a problem in that such a system requires employment of a telephone dedicated to the system for both outside and household phones, resulting in increased costs to the system.

Furthermore, a plurality of the above-mentioned electronic devices may be connected to a single line in some cases. In these cases, it becomes necessary to differentiate the destination of the incoming call, the telephone in the household or the electronic devices. It also becomes necessary to differentiate the call destination among the electronic devices. Thus, there arises a problem in that the entire system becomes rather complicated, reliability and usability of the system is deteriorated, and the cost thereof further increases.

On the other hand, there is a problem in that since the electronic devices in households are activated by the outside telephone described above by sending various signals in a state in which the telephone line is connected, a telephone cost is generated even for activation of each type of electronic device. Furthermore, there is a problem in that in the absence of a common communications regulation with respect to activation and operation of a line connection type for each kind of electronic device, the signal content associated with activation, operation and the like of each kind of electronic device differs, so that a system with favorable usability and operability cannot be secured.

BRIEF SUMMARY OF THE INVENTION

The present invention has been made in view of such problems, and an object thereof is to provide a network device control system and a network interconnection apparatus, wherein a network device is controlled by allowing a telephone call to be made from an outside telephone which is a communications apparatus to a network interconnection apparatus such as a router or the like which is connected to a local area network such as a LAN.

Another object of the invention is to provide a network device control system and a network interconnection apparatus, wherein a network device which is in a wait state is actuated via the network interconnection apparatus even from an outside telephone.

Still another object of the present invention is to provide a network device control system which can identify an address of a network device from the outside.

Moreover, an object of the invention is to provide a network device control system and a network interconnection apparatus, wherein a predetermined network device is controlled in a case where a plurality of network devices are included in the local area network.

Furthermore, an object of the present invention is to provide a network device control system and a network device, wherein the activation of the network device is allowed in a state where the telephone line is not connected as a circuit.

Still furthermore, an object of the invention is to provide a network device control system which can activate an electronic device with certainty in differentiation from an answering machine provided telephone or the like even in the case where the answering machine provided telephone, a facsimile machine or the like is connected to a single line together with the electronic device.

Still furthermore, an object of the present invention is to provide a network device control system which can activate an intended electronic device with certainty without providing special means even in the case where a plurality of electronic devices are connected to a single line.

A network device control system according to the present invention for controlling an operation of a network device included in a local area network having a network interconnection apparatus via the network interconnection apparatus with a communications apparatus outside the local area network is characterized in that the network interconnection apparatus comprises: connection means connected to the telephone line; means for detecting a calling state generated by the communications apparatus via the telephone line; and means for sending a signal to the network device when the calling state is detected.

Since in this network device control system the network interconnection apparatus comprises connection means connected to a telephone line, and means for detecting the calling state, the line of the telephone line can be directly connected to the network interconnection apparatus to enable sending a signal associated with control of the network device. Consequently, since the network interconnection apparatus outputs a signal to the network device with only one telephone call addressed to the network interconnection apparatus from the outside communications apparatus, the network device in the local area network can be controlled from the outside communications apparatus. Furthermore, since only a telephone call is made from the outside communications apparatus, only a single line is required as the telephone line connected to the network interconnection apparatus.

The above-mentioned network device control system may be such constructed that the signal is a packet signal for activating the network device in the wait state.

In this network device control system, the network device in the wait state can be activated using a packet signal for activation as a control signal sent by the network interconnection apparatus even when the telephone itself cannot send a packet signal for activation. Furthermore, the network device control system can be shifted to an operation control step of the network device after the activation with certainty.

In the above-mentioned network device control system, the network interconnection apparatus may connect the local area network and another local area network, the another local area network may include a network management apparatus, and the network device may comprise means for requesting the network management apparatus to give an address for identifying the location of the network device based on the another local area network when the network device is activated.

In this network device control system, the activated network device accesses the another local area network to request to give an address based on the another local area network such as the Internet, and thereby the outside communications apparatus can realize sending and receiving of a signal with the network device using the given address.

In the above-mentioned network device control system, the network interconnection apparatus may further comprise means for notifying the given address to the network device from the network management apparatus.

Furthermore, in the network device control system, the network device may further comprise means for sending the notified address to the communications apparatus.

In these network device control systems, since the given address is notified to the network device via the network interconnection apparatus, the network device can obtain an address thereof in another local area network with certainty. Furthermore, the network device notifies the obtained address to the outside communications apparatus, so that the outside communications apparatus can identify the address of the network device included in a local area network. Consequently, after the address is identified, various control signals and data requests are sent from the outside communications apparatus to the identified address, so that the network device can be freely controlled from the outside. Furthermore, communications from the network device to the outside communications apparatus can be conducted by sending e-mail. At that time, it is preferable that the content of the address can be encoded for the prevention of address leaks.

A network device control system according to the present invention for controlling an operation of the network device included in a local area network having a network interconnection apparatus via the network interconnection apparatus with the communications apparatus outside the local area network is characterized in that the network interconnection apparatus comprises: connection means connected to a telephone line; means for detecting a calling state generated by the communications apparatus via the telephone line; means for displaying on the communications apparatus a menu screen on which the network device is displayed and either of the displayed network devices can be selected as a target of control when the calling state is detected; and means for sending a signal to the selected network device when the network device is selected.

In this network device control system, the menu screen is displayed at the outside communications apparatus, so that the network device which is a control target can be selected through the outside communications apparatus. Consequently, usage of the system according to the present invention can be further broadened. In addition, the device is selected in association with the NAT (Network Address Translation) technology. According to the NAT technology, the addition of a port number of the network interconnection apparatus, which is connected with the network device, at the end of the address of the network interconnection apparatus based on another local area network enables the network interconnection apparatus to send a signal to a specific network device. According to the present invention, when a device is selected, the port number of the selected network device is automatically added to the end of the address of the network interconnection apparatus to send a signal to the selected network device. In addition, the present invention can be applied whether one network device is included in the local area network or a plurality of network devices are included.

In the above-mentioned network device control system, the network interconnection apparatus may connect the local area network and the another local area network, and the another local area network may include a network management apparatus. Furthermore, the network interconnection apparatus may comprise means for requesting the network management apparatus to give an address for identifying the location of the network interconnection apparatus based on the another local area network when the calling state is detected, means for receiving the given address from the network management apparatus and means for sending the received address to the communications apparatus.

In this network device control system, the network interconnection apparatus accesses the another local area network to request to give the address thereof, so that the address notification process can be simplified. Furthermore, the outside sending device can access the specific network device with the above-mentioned NAT technology via the network interconnection apparatus by sending the given address thereof to the outside communications apparatus.

A network device control system according to the present invention for controlling an operation of a network device included in a local area network having a network interconnection apparatus via the network interconnection apparatus with a communications apparatus outside the local area network is characterized in that the network interconnection apparatus comprises: connection means connected to a telephone line; means for detecting a calling state generated by the communications apparatus via the telephone line; means for storing a set calling state; means for comparing the calling state detected by the detecting means with the calling state stored in the storing means; and means for sending a signal to the network device.

In this network device control system, the network interconnection apparatus can receive an instruction from an outside device with certainty in order to detect the calling state associated with the telephone call from the outside communications apparatus. In addition, the calling state includes a calling frequency associated with the number of telephone calls which are made, a call interval, and a calling sound frequency per one call. These numbers are set in advance in the network interconnection apparatus, and are compared with a calling state generated by the outside communications apparatus, and thereby the call to the network device can be differentiated and a signal can be sent to the network device with certainty.

In the above-mentioned network device control system, the network interconnection apparatus may connect the local area network and the another local area network. The another local area network may include the network management apparatus, and the network interconnection apparatus may further comprise means for requesting the network management apparatus to give an address for specifying the location of the network interconnection apparatus based on the another local area network when the comparison result indicates that the two calling states are identical, means for receiving the given address from the network management apparatus, and means for sending the received address to the communications apparatus.

In this network device control system, the network interconnection apparatus accesses the another local area network to request to give the address of the network interconnection apparatus to finally send the given address to the outside communications apparatus, and thereby notification of the address can be swiftly handled and the outside communications apparatus can grasp the sending address with certainty.

In the above-mentioned network device control system, a plurality of network devices may be provided, and the means for storing the calling state can store the calling state set for each of the network devices while means for sending the control signal may send the signal to the network device for which a calling state identical with the detected calling state is set, when comparison result indicates that the two calling states are identical.

In this network device control system, a calling state can be set for each of the network devices, so that a telephone call from the outside communications apparatus on the basis of the setting of the network device of a control target enables sending a signal to the specific network device from the network interconnection apparatus. Consequently, even if the local area network includes a plurality of network devices, each of the network devices can be differentiated with certainty, so that the specific network device can be activated and controlled. Furthermore, after the activation of the device, each type of operation such as data exchange or the like can be conducted between the outside communications apparatus and the network device.

In the above-mentioned network device control system, the network device may be a computer or an electronic device.

In this network device control system, a computer or an electronic device having a network connection function can be introduced as a network device, so that the system according to the present invention can be preferably applied to various kinds of network systems such as a home network. In addition, the electronic device includes a video apparatus, an air conditioner, a refrigerator, an electronic cooking device (a microwave oven), and an automatic bath such as a bath preparing apparatus or a bath-water heating apparatus. Furthermore, the system according to the present invention can be applied to networks in OA (office automation), FA (factory automation) or the like, in addition to the home network.

A network device control system according to the present invention for activating a network device connected to a telephone line from an outside communications apparatus is characterized in that the network device comprises: means for detecting a calling state generated by the communications apparatus; means for storing a set calling state; means for comparing the calling state detected by the detecting means with the calling state stored in the storing means; and means for activating the network device when the comparison result indicates that the two calling states are identical.

In this network device control system, the network device connected to the telephone line utilizes the calling state generated by a telephone or the like which is an outside communications apparatus, so that the network device connected to the line can be activated even in a state where the telephone line is not connected as a circuit and generation of telephone costs associated with the activation can be substantially eliminated. Furthermore, it is not necessary to provide a special function or the like for an outside telephone or the like which serves as a calling device, since the network device detects the calling state. Furthermore, the network device activates at least only means for confirming the calling state generated by the telephone, and the device allows other units to remain in a wait state, so that the power consumption required for the wait state of the network device can be suppressed to a low level.

In the above-mentioned network device control system, the calling state may include a calling frequency, a calling interval or a calling sound frequency per each calling.

In this network device control system, the calling state is defined specifically as a calling frequency, a calling interval, and a calling sound frequency per each calling, so that the predetermined network device can be activated with certainty. In addition, in order to prevent erroneous activation of the network device due to a wrong number call or the like, it is preferable to set the calling frequency to a plurality of times. Furthermore, since utilized for the call for activation are the calling frequency, the calling interval, and the calling sound frequency per each calling before connection of the telephone line as a circuit, telephone costs are not generated, and the cost required for activation can be largely eliminated as compared with the prior systems.

In the above-mentioned network device control system, the network device may be connected to the telephone line via an answering machine provided telephone, facsimile machine or a telephone line connection apparatus, and the calling sound frequency stored in the storing unit is set at a frequency smaller than the calling sound frequency for allowing a function to start operation with respect to a call for the answering machine provided telephone, facsimile machine, or telephone line connection apparatus.

In this network device control system, even in a case where a network device is connected to a single line via an answering machine provided telephone, a facsimile machine or the like, the target of the call can be differentiated by setting the calling sound frequency of the network device as described above, and thereby the network device can be activated with certainty before the operation of, for example, the answering machine function of the answering machine provided telephone. Furthermore, since the target of the call is differentiated, the activation and control of the telephone can be conducted while maintaining a normal usability of the answering machine provided telephone or the like. In addition, the telephone line connection apparatus corresponds to a modem, a terminal adapter or the like to be connected to a computer or the like.

In the above-mentioned network device control system, the network device may further comprise means for notifying to the communications apparatus the fact that the network device has been activated, when the network device is activated by a call from the communications apparatus.

In this network device control system, since the network device notifies activation to the outside communications apparatus as a calling device, the outside communications apparatus can confirm activation of the network device with certainty, so that the outside communications apparatus can be smoothly shifted to the operation step for the operation of the network device after activation. Furthermore, activation can be notified from the network device by allowing the network device to make a call to the communications apparatus as an target of the call. Furthermore, when the communications apparatus as a calling device is provided with an environment for sending and receiving e-mail through the network, activation may be notified by e-mail. In addition, the operation control signal after activation of the network device is sent in a state where the telephone line or the network is connected.

In the above-mentioned network device control system, a plurality of network devices may be provided, the plurality of network devices may be connected to the identical calling system of the telephone line, and the calling state of each of the network devices may be set in a different manner, respectively.

In this network device control system, even in a case where a plurality of network devices are connected to the same line, a specific network device can be activated with certainty with differentiation from other network devices when called in a set state unique to the network device which is desired to be activated from the communications apparatus, by setting different calling states for each of the network devices.

In the above-mentioned network device control system, the network device may be any of an image recording/reproducing apparatus, a sound recording/reproducing apparatus, an air conditioner, a refrigerator, a rice cooking device and a bath preparing apparatus or a bath water heating apparatus.

In this network device control system, a network device which is often used in general households is set as a target of the present invention, so that the system according to the present invention can be introduced to general households. That is, the kind of network device is set to either of the image recording/reproducing apparatus corresponding to a video apparatus, the bath preparing apparatus or the bath water heating apparatus associated with an automatic bath, which leads to improvements in convenience of life in general households.

A network interconnection apparatus according to the present invention which can connect a plurality of networks is characterized by comprising: connection means connected to a telephone line; means for detecting a calling state that is called from the outside via the telephone line; and means for outputting a signal to the outside via the network when the calling state is detected.

In this network interconnection apparatus, since the connection means with a telephone line, means for detecting the calling state and the like are provided, the network interconnection apparatus can be directly connected to the telephone line, so that a telephone call from the outside via the telephone line can be detected. On outputting a signal based on the detection, devices included in the network can be controlled by outputting a signal from the outside to the signal output target in the network via the network interconnection apparatus.

The above-mentioned network interconnection apparatus may further comprise means for outputting to the signal output target through the network an address for specifying the location of the signal output target on the basis of the network.

In this network interconnection apparatus, an address based on the network of a network device or the like which is to be a signal output target in the network can be notified to the output target at the outside, so that the location of the output target can be identified with certainty.

The above-mentioned network interconnection apparatus may further comprise means for requesting the network to give an address for identifying the location thereof based on the network when the calling state is detected, means for receiving the given address from the network, and means for outputting the received address to the calling device of the calling state via the network.

In this network interconnection apparatus, since the network interconnection apparatus requests to give the address thereof in the network, notification of the address can be swiftly handled. In addition, after the address is obtained, as described above-mentioned, the address is notified to the outside calling device. However, access to the network from the outside can be handled using the NAT technology.

The above-mentioned network interconnection apparatus may further comprise means for displaying on a calling device of the calling state a menu screen on which the output target of the signal is displayed when the calling state is detected to enable selection of any of the output targets which are displayed, so that when any of the output targets is selected, the means for outputting a signal can output the signal to the selected output target.

In this network interconnection apparatus, even in a case where a plurality of signal output targets exist in the network, the signal can be outputted to a specific output target since the output target is displayed on the menu screen.

A network interconnection apparatus according to the present invention which can connect a plurality of networks is characterized by comprising: connection means connected to a telephone line; means for detecting a calling state generated from the outside via the telephone line; means for storing a set calling state; means for comparing the calling state detected by the detection means and the calling state stored in the storing means; and means for outputting a signal to the outside via the network when the comparison result indicates that the two calling states are identical.

In this network interconnection apparatus, since means for setting a calling state and comparison means are provided, the network interconnection apparatus can differentiate and judge the signal output target with certainty on the basis of the calling state generated from the outside.

The above-mentioned network interconnection apparatus may further comprise means for requesting the network to give an address for specifying the location thereof based on the network, means for receiving the given address from the network, and means for outputting the received address to the calling device of the calling state through the network.

In this network interconnection apparatus, since the network interconnection apparatus itself requests to give the address thereof in the network, process associated with address notification can be swiftly conducted.

In the above-mentioned network interconnection apparatus, the means for storing a calling state may store a calling state which is set in a different manner for each of the plurality of output targets to which signals are outputted, and the means for outputting a signal may be configured to output a signal to the output target for which a calling state identical with the detected calling state is set when the comparison result indicates that the two calling states are identical.

In this network interconnection apparatus, a signal can be outputted with a specific output target differentiated with certainty, even in a case where a plurality of signal output targets exist in the network.

A network device according to the present invention which can be connected to a telephone line is characterized by comprising: means for detecting a calling state generated by an outside communications apparatus via the telephone line; means for storing a set calling state; means for comparing the calling state detected by the detection means with the calling state stored in the storing means; and means for activating the network device when the comparison result indicates that the two calling states are identical.

In the above-mentioned network device, the calling state may include a calling frequency, a calling interval, and a calling sound frequency per each calling.

Since any of these network devices comprises means for detecting a calling state and means for storing a calling state for activation, the network device can be activated only by a call from the outside communications apparatus before connection of the telephone line as a circuit, and generation of telephone costs for activation can be eliminated. Furthermore, even in a case where an answering machine provided telephone or the like and other network devices are connected to a single line, a specific network device can be activated with certainty by appropriately adjusting the set content.

The above-mentioned network device may further comprise means for notifying to the communications apparatus the fact that the device has been activated when activated with a call from the communications apparatus.

In this network device, the outside communications apparatus which makes a call can grasp the state of the network device with certainty by providing means for notifying activation to the communications apparatus. Thereby, the input period of operation for operating the network device can be judged and a shift from the activation step to the operation step can be smoothly carried out.

The above and further objects and features of the invention will more fully be apparent from the following detailed description with accompanying drawings.

BRIEF DESCRIPTION OF THE SEVERAL VIEWS OF THE DRAWINGS

FIG. 3 is a flowchart associated with activation of a computer or the like;

FIG. 4 is a flowchart associated with notification of a network address or the like;

FIG. 6 is a flowchart associated with activation of a computer according to the second embodiment or the like;

DETAILED DESCRIPTION OF THE INVENTION

Figure 1:
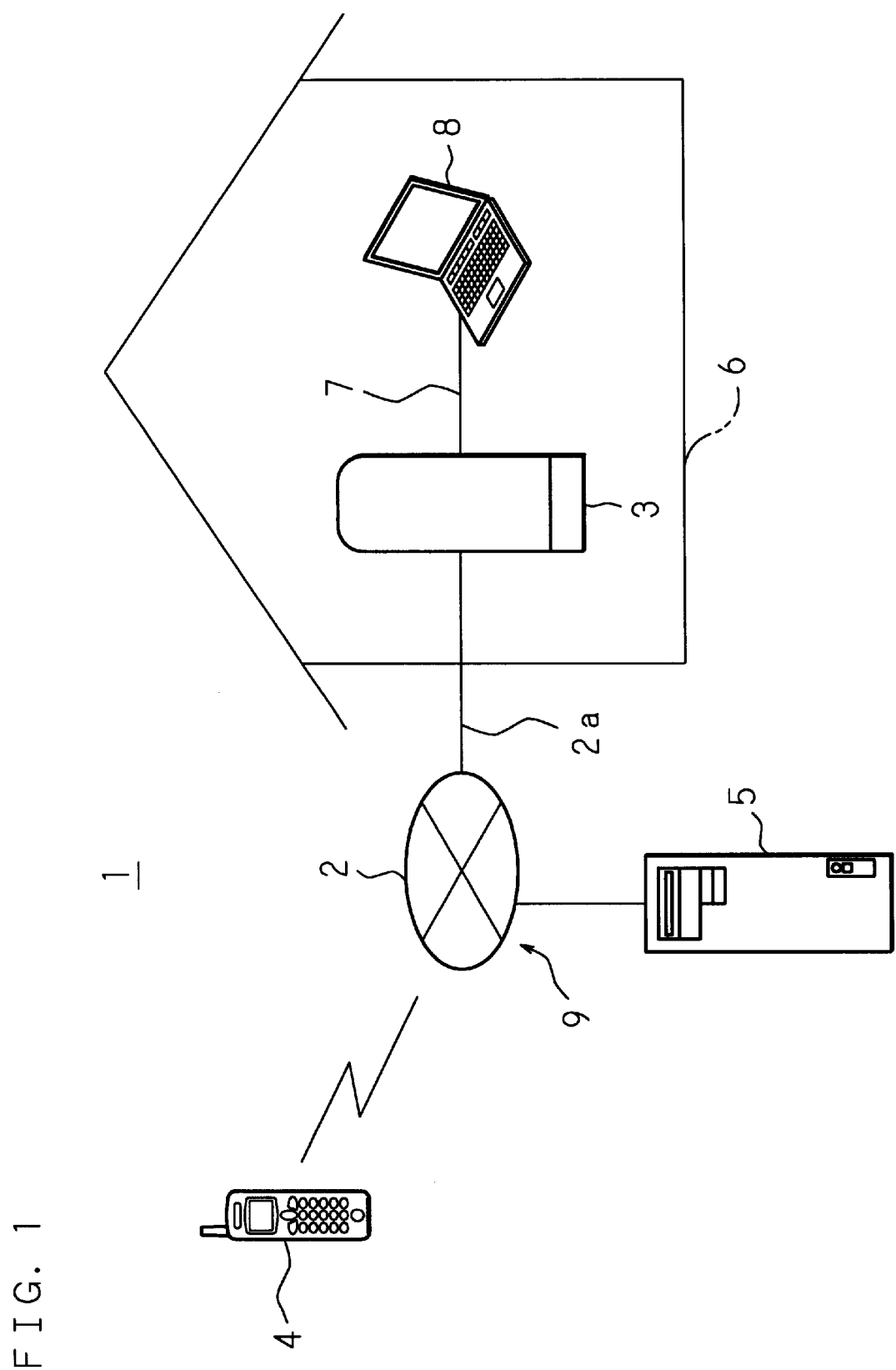
FIG. 1 is a system structural view of a network device control system according to a first embodiment of the present invention.

The following description will explain the present invention with reference to the drawings illustrating some embodiments thereof.
First Embodiment
FIG. 1 is a view showing an overall structure of a network device control system 1 according to a first embodiment of the present invention. The network device control system 1 connects a telephone line 2 and a local area network 7 built in a building 6 via a router 3 which is a network interconnection apparatus to enable an access to the router 3 via the telephone line 2 from an outside telephone 4 which is a communications apparatus.

In addition to use as a telephone line, the telephone line 2 is also used as another outside local area network. In the first embodiment, the above-mentioned another local area network is applied to the Internet 9 which is one of the wide local area networks, and a server 5 is connected to the telephone line 2 as a network management apparatus of a network provider for managing the connection to the Internet 9. Consequently, the router 3 connects the local area network 7 and the Internet 9 as a network while a telephone call addressed to the router 3 can be received via the connection with the telephone line 2. In addition, the router 3 is introduced into the building 6 via the telephone line 2 to be connected to a single line 2a having a specific telephone number.

Furthermore, to the local area network 7, a computer 8 as a network device is connected. To this computer 8, a device of a type corresponding to WOL (Wake On LAN) technology is applied while a program which is automatically executed after activation is incorporated, so that a request is made to the server 5 for connection to the Internet 9 on the basis of this program.

Figure 2:
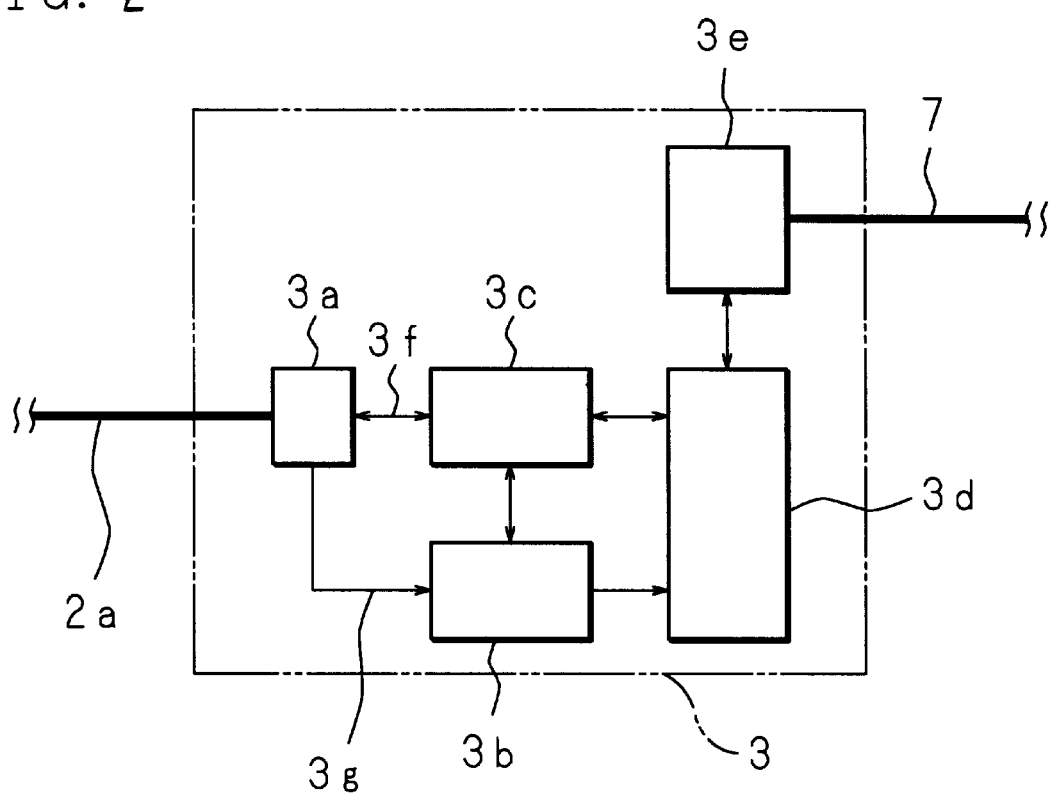
FIG. 2 is an internal structural view of a router according to the first embodiment.

As shown in FIG. 2, the router 3 is provided with a line connection unit 3a, a line monitoring unit 3b, a communications control unit 3c, a central control unit 3d and a local area network control unit 3e, which are interconnected. To one side of the line connection unit 3a, an end portion of the single line 2a is directly connected from the outside, while the single line 2a is branched off at the other side to a network system 3f to the Internet 9 and a telephone line system 3g.

The network system 3f is a system used for sending and receiving various signals from a clue of a network address using the telephone line 2 as a network. The telephone line system 3g is a system used for receiving various signals from a clue of the telephone number using the telephone line 2 for sending a telephone call.

The line monitoring unit 3b is connected with the telephone line system 3g, and is a unit for receiving telephone calls addressed to the single line 2a from the outside. To constantly enable receiving of telephone calls, only the line monitoring unit 3b is activated with the wait power even when the router 3 is in the wait state. Furthermore, when the incoming calling sound of the receiving telephone is detected, the line monitoring unit 3b sends a signal of detection to the central control unit 3d while, after sending the signal, the telephone number is stored and the line is cut. On the other hand, the communications control unit 3c is connected with the network system 3f, and is a unit for sending and receiving various signals on the basis of the Internet 9 and the network address.

Furthermore, the central control unit 3d is a unit for conducting various controls or the like of the entire router 3. While the central control unit 3d receives a signal from the line monitoring unit 3b, the unit 3d sends and receives various signals between the communications control unit 3c and the local area network control unit 3e. Furthermore, the local area network control unit 3e enables connection with the local area network 7. Furthermore, the local area network control unit 3e sends and receives various signals to and from the local area network 7, receives an instruction signal from the central control unit 3d and sends the magic packet for activation to a computer 8 connected to the local area network 7 on the basis of the instruction.

In addition, the outside telephone 4 is of a type equipped with a function for connecting to the Internet 9. Both of an installed type telephone and a portable type telephone which can make a call via the telephone line 2 can be applied thereto. (FIG. 1 illustrates a portable type telephone.) Furthermore, in addition to a telephone, a PDA (Personal Digital Assistant) or the like equipped with a communications function can be applied to the communications apparatus.

Figure 3:
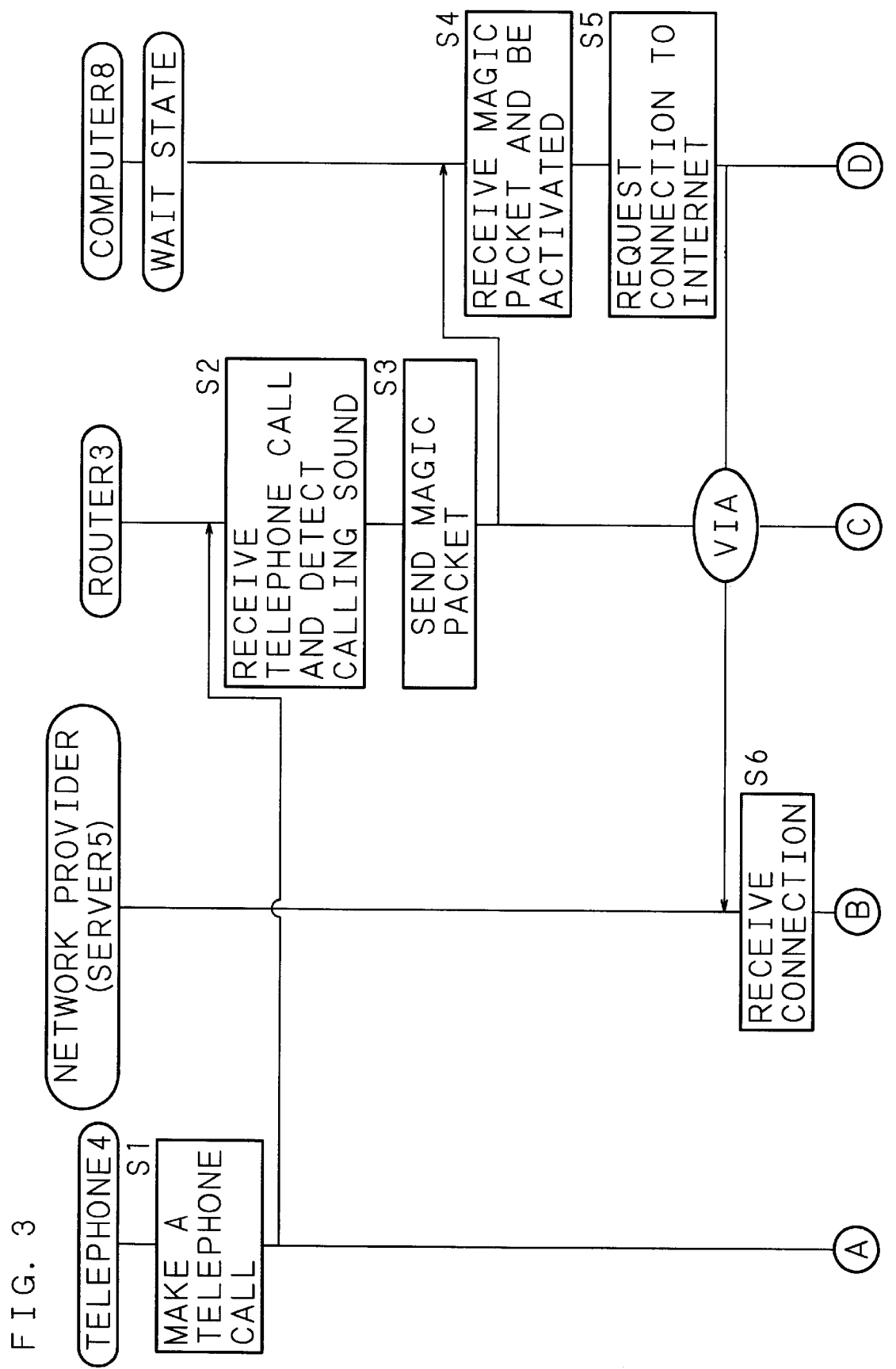
Figure 4:
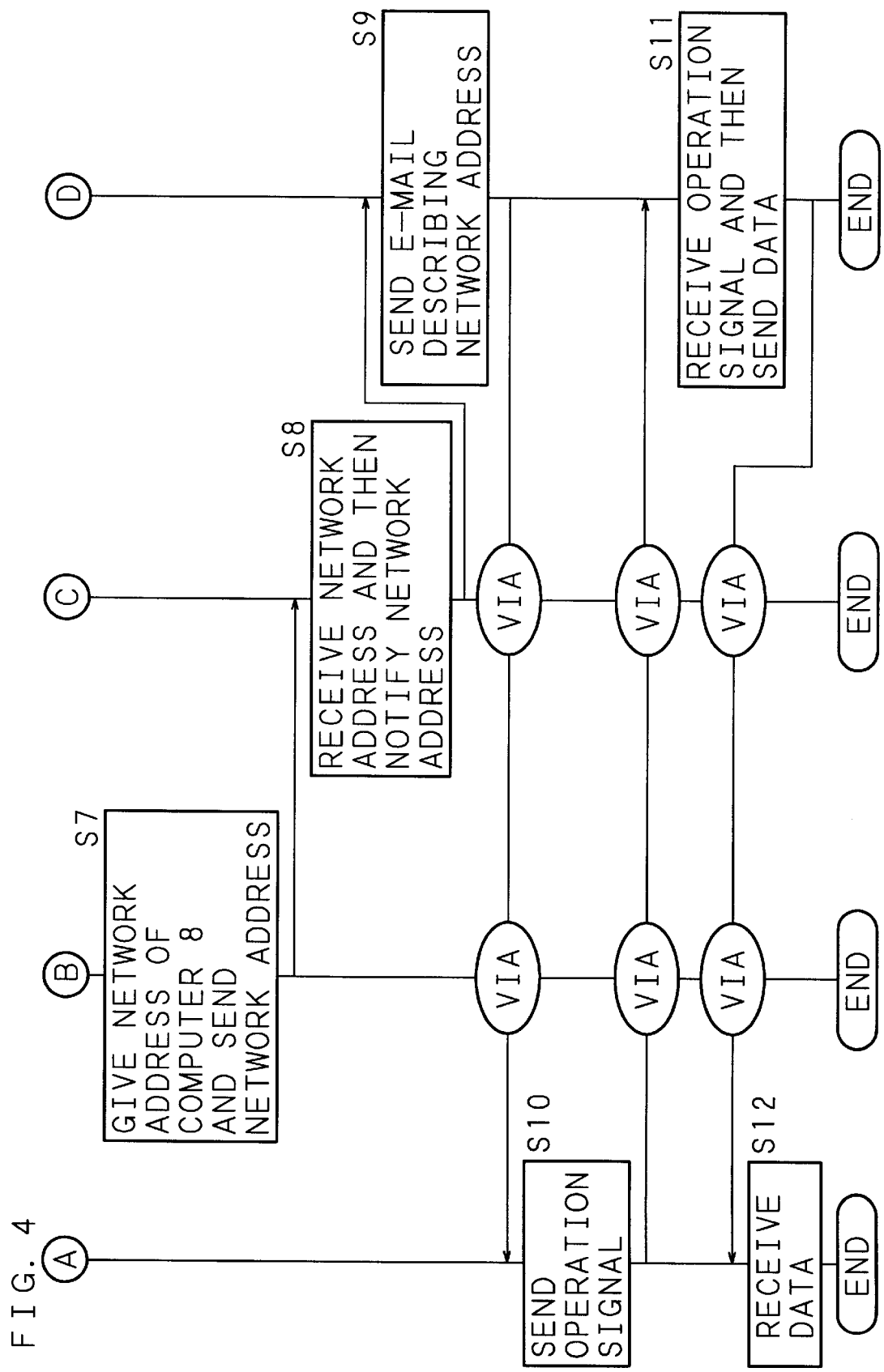

Next, an explanation is given in accordance with the flowcharts shown in FIGS. 3 and 4 on a control form in which the computer 8 in the wait state which is included in the local area network 7 is activated from the outside telephone 4 to attain operation in the network device control system 1 according to the present invention. It should be noted that symbols "A", "B", "C" and "D" in FIG. 3 have meanings to be continued to "A", "B", "C" and "D" in FIG. 4.

First, a telephone call is made to a single line 2a, to which the router 3 is connected, from the outside telephone 4 (S1). The router 3 receives the telephone call at the line monitoring unit 3b shown in FIG. 2 and detects the incoming calling sound of the telephone (S2). After detection, the line monitoring unit 3b cuts off the telephone call after storing the telephone number of the outside telephone 4 while sending a signal of the detection to the central control unit 3d together with data of the telephone number.

Furthermore, the central control unit 3d which has received the signal sends an instruction signal to the local area network control unit 3e to send a packet for activation to the computer 8. On the basis of this instruction signal, the local area network control unit 3e sends a magic packet based on WOL (Wake On LAN) technology through the local area network 7 to the computer 8, together with data of the telephone number (S3).

The computer 8 in the wait state, when receiving the magic packet, is activated (S4) and requests connection to the server 5 of the Internet 9 via the router 3 by a program for automatic execution (S5).

The server 5 which has received the connection request receives a connection between the computer 8 and the Internet 9 (S6). Thereafter, as shown in the flowchart of FIG. 4, a network address for identifying the location of the computer 8 based on the Internet 9 is given to temporarily send the network address to the router 3 (S7). On receiving this network address, the router 3 notifies the network address to the computer 8 through the local area network 7 (S8). Herein, the network address on the Internet of the computer 8 is given as described above, so that the network address can be identified from the outside of the local area network 7 even when the network address goes beyond the router 3.

The computer 8 which has received the notification sends an e-mail, in which the notified network address is described on the basis of the program for the automatic execution, on the basis of the data of the received telephone number (S9). Then, this e-mail is sent from the local area network 7 via the router 3 as well as via the server 5 of the Internet 9 to be sent to the outside telephone 4 having the telephone number.

The outside telephone 4 is notified of the network address on the Internet 9 of the computer 8 by receiving this e-mail. Thereafter, the outside telephone 4 can operate the computer 8 from the outside by sending each kind of operation signal to this network address. Herein, the control contents associated with the operation of the computer 8 include the incorporation of the data in the computer 8 into the telephone 4, and sending of the data in the telephone 4 into the computer 8.

For the operation described above, the outside telephone 4 sends an operation signal associated with the control contents of the computer 8 to the notified network address of the computer 8 (S10). The signal is sent to the computer 8 of the local area network 7 via the server 5 of the Internet 9 and router 3.

The computer 8 is operated on the basis of the received operation signal to send the data to the telephone 4 (S11). The data is received by the telephone 4 via a route opposite to the above-mentioned operation signal (S12). In addition, in a case where the operation content are complicated, an operation from the step of sending the operation signal (S10) up to the step of receiving data (S12) is conducted a plurality of times.

It should be noted that the network device control system 1 according to the first embodiment is not limited to the above-mentioned form and a variety of variations can be made. For example, the local area network 7 may be built in a fixed area such as inside a household, inside an office and inside a factory, so that a system connected to an outside other local area network such as the Internet 9 can be formed. Furthermore, in addition to the computer 8, the network device connected to the local area network 7 can be any electronic device of various kinds which has a network connection function and corresponds to WOL (Wake On LAN) technology, such as a video apparatus, an air conditioner, a rice cooking device or the like.

For example, in a case where a video apparatus is connected to the local area network 7, the video apparatus in the wait state can be activated from the outside telephone 4. After activation, the video apparatus can be operated by the telephone 4 by notifying the network address thereof to the telephone 4, and thereby the time controlled image recording or the like of the video apparatus can be performed from the outside.

Second Embodiment

Figure 5:
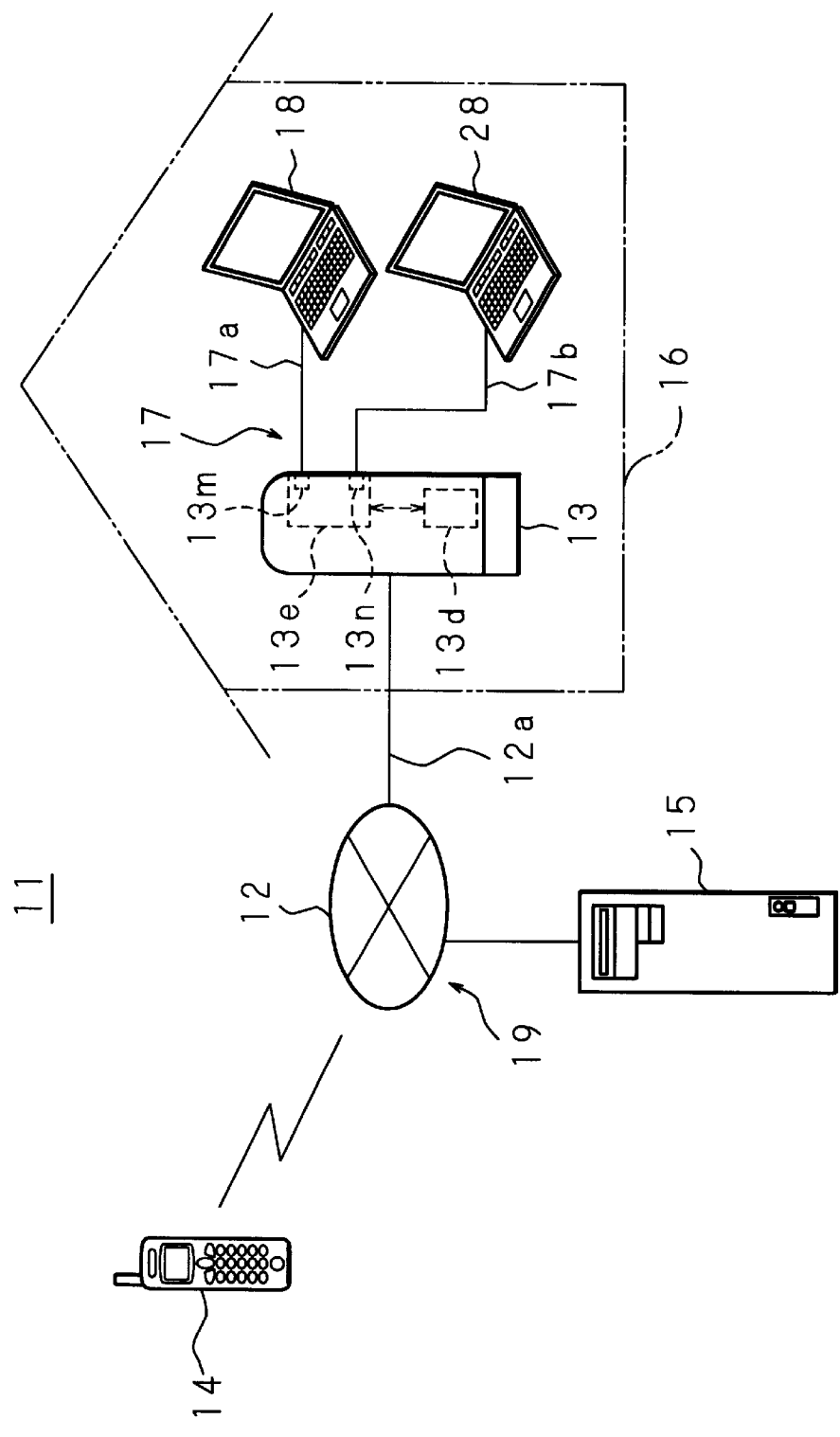
FIG. 5 is a system structural view of a network device control system according to a second embodiment of the present invention.

FIG. 5 is a system structural view of a network device control system 1 according to a second embodiment of the present invention. Two computers, a first computer 18 and a second computer 28, are connected as network devices to the local area network 17 inside the building 16. In addition, in terms of the system structure, units other than the units described above are constructed in the same manner as the first embodiment, for example, a telephone line 12 which is used as the Internet 9 is connected to the router 13 and the server 15 is connected to the telephone line 12 while it is configured in such a manner that the router 13 can be accessed through the telephone line 12 from the outside telephone 14.

Furthermore, the router 13 basically has the same internal structure as the router 3 of the first embodiment shown in FIG. 2. However, two network devices in total are connected, so that a plurality of connection ports 13m and 13n are provided to the local area network control unit 13e and two signal cable lines 17a and 17b associated with the local area network 17 are connected (see FIG. 5). Furthermore, in the central control unit 13d of the router 13, it is required to send the magic packet by differentiating the first computer 18 and the second computer 28, so that an operation different from the case of the first embodiment is conducted.

Figure 7:
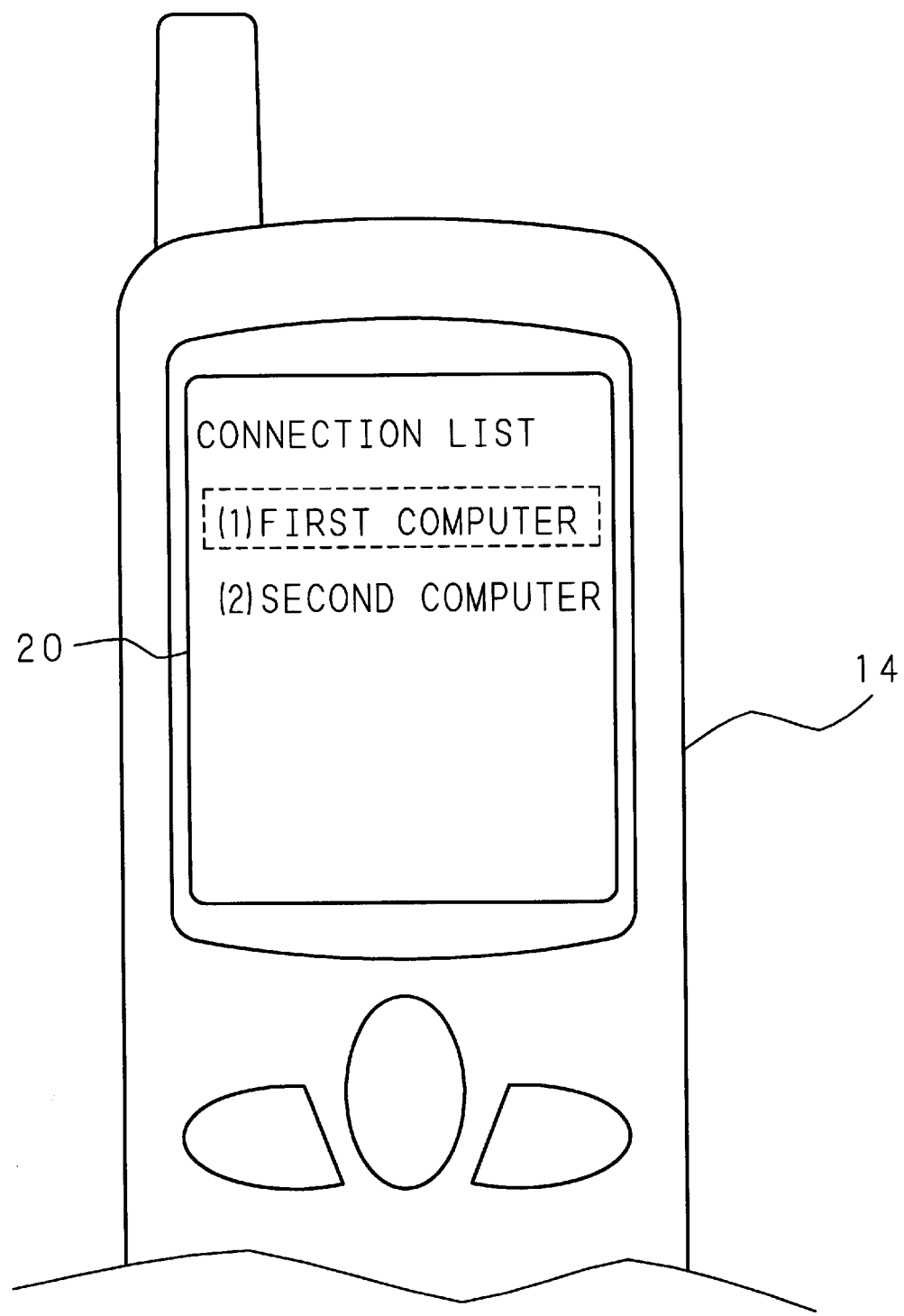
FIG. 7 is a view showing a selection screen of the computer.

That is, in the case where the central control unit 13d receives an incoming signal of the outside telephone 14, a request for connection to the Internet is made to the server 15 of the Internet 19. Furthermore, as shown in FIG. 7, in the internal storing unit of the central control unit 13d a program is stored for displaying a selection screen 20 which serves as a menu screen on which a computer of a control target is selected, so that the central control unit 13*d* also conducts a control for sending to the telephone 14 the data associated with the given network address and the above-mentioned program.

In addition, the outside telephone 14 is provided with retrieval software which can display a selection screen 20 or the like. When the selection screen 20 is displayed, either of the first computer 18 or the second computer 28 displayed on the selection screen 20 can be selected by operating the telephone 14. Furthermore, when either of the computers is selected, a selection signal indicating which computer has been selected is sent from the telephone 14 to the router 13.

On receiving the selection signal, the central control unit 13*d* is controlled so as to send a magic packet to the selected computer on the basis of the signal. The signal is sent to the selected device on the basis of NAT (Network Address Translation) technology. At the end of the numeric value of the network address (global address) on the Internet of the router 13 given by the server 15, the port number of the connection port 13*m* or 13*n* of the router 13 to which the first computer 18 or the second computer 28 is connected is added to send a magic packet to the local area network 17, so that the packet can be sent to the computer on the intended side. That is, when the central control unit 13*d* receives the selection signal on the selection screen 20, the port number on the selected side is automatically added to the end of the network address of the router 13.

Next, in the network device control system 11 according to the second embodiment, a control form in which the first computer 18 of the local area network 17 is differentiated from the second computer 28 and is activated by the outside telephone 14 will be explained hereinafter in accordance with the flowchart of FIG. 6.

First, a telephone call is made to the single line 12*a*, to which the router 13 is connected, from the telephone 14 (S20). On the other hand, the router 13 receives the telephone call and detects the incoming calling sound of the telephone (S21), stores the telephone number of the outside telephone 14, hangs up the telephone and makes a request for the connection to the server 15 of the Internet 19 (S22).

The server 15 which has received the connection request receives a connection of the router 13 to the Internet 19, and a global network address is given for specifying the location of the router 13 based on the Internet 19 to send the network address to the router 13 (S23). While the router 13 sends the network address of the router 13 by an e-mail to the outside telephone 14 on the basis of the stored telephone number after receiving the network address, the router 13 also sends data of the program associated with the selection screen 20 (S24). Data is sent via the server 15, and the selection screen 20 of FIG. 7 is displayed on the display screen of-the telephone 14 to select a computer which is to be activated (S25). In this embodiment, the first computer 18 is selected.

On the basis of the selection of the computer, a signal indicating that the first computer 18 has been selected is sent to the router 13 via the server 15. The router 13 receives the selection signal and sends the magic packet to the local area network 17, using the numeric value obtained by adding a port number of the selected first computer 18 at the end of the global network address of the computer itself as a sending target (S26). Herein, the sending target is such formed that when the global network address is a numeric value such as "200. 100. 1. 4" and the port number to which the first computer 18 is connected is "81", the sending target will be a numeric value such as "200. 100. 1. 4: 81."

The first computer 18 which has received the magic packet is activated from the wait state with WOL (Wake On LAN) technology included in the magic packet (S27). With respect to the first computer 18 which is activated, the activation is notified to the outside telephone 14 from the server 15 via the router 13. Thereafter, in the same manner as the first embodiment, a predetermined operation is conducted between the telephone 14 and the first computer 18 in accordance with the procedure from the operation signal sending step (S10) up to the data receiving step (S12) in the flowchart of FIG. 4.

Figure 6:
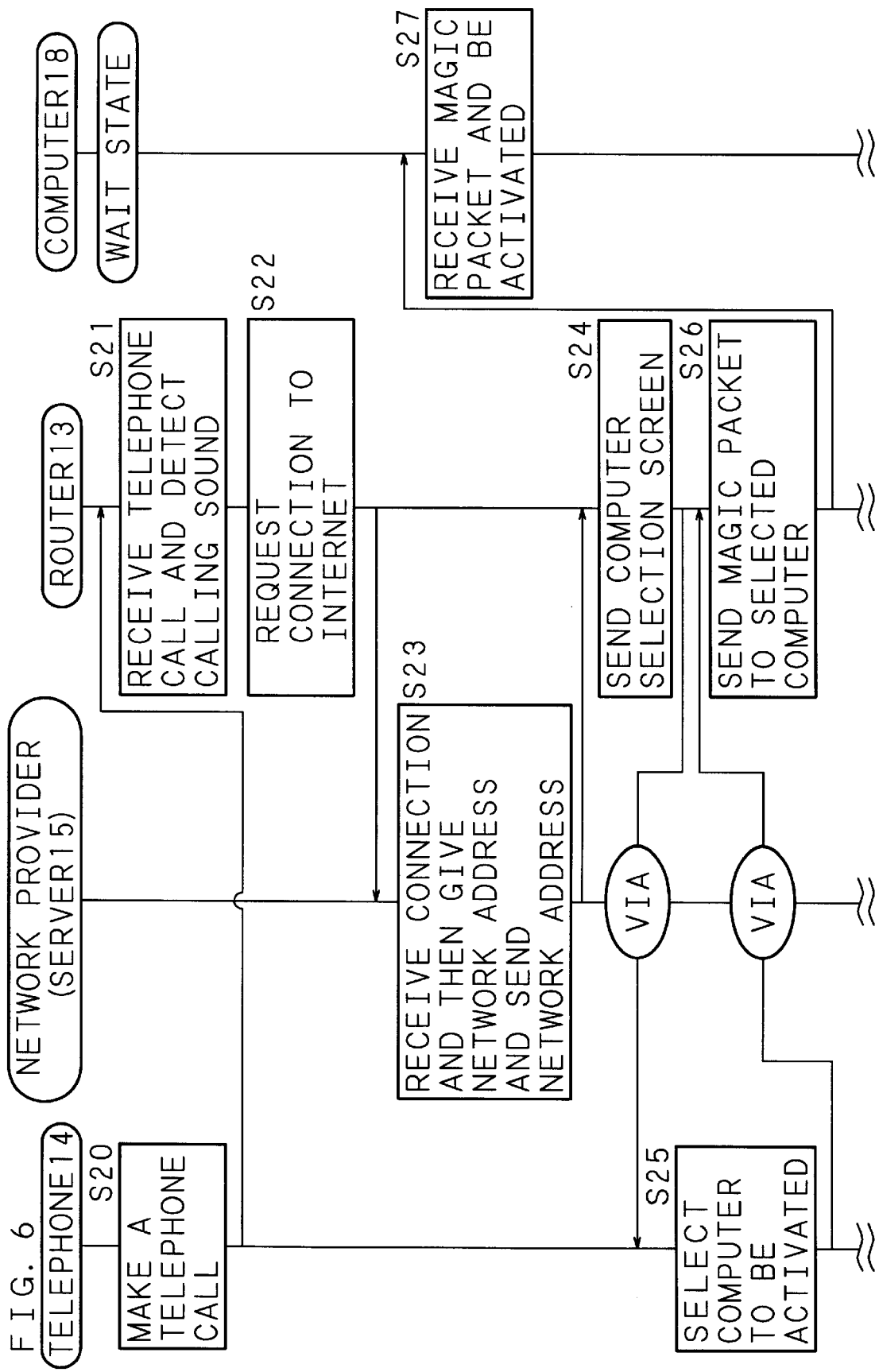

In addition, in a case where the second computer 28 is activated instead of the first computer 18, the second computer is selected on the selection screen 20 of FIG. 7 which is displayed on the telephone 14 on the selection step (S25) of the activation computer of the flowchart of FIG. 6, and thereby the router 13 sends the magic packet to the second computer 28 to enable activation of the second computer 28.

Furthermore, in the network device control system 11 of the second embodiment, the number of the network devices such as computers or the like to be connected to the local area network 17 is not limited to two. The number of network devices may be one, or furthermore, two or more network devices can be connected when two or more connection ports for router 13 are provided. In this case, even on the selection screen of FIG. 7, the connected network devices can be displayed so that either of the network devices can be selected.

It should be noted that, in a case where one network device is connected to the local area network 17, it is not necessary to particularly select the device. Thus, the process associated with the selection screen 20 may be omitted. Furthermore, with respect to the units other than the units described above, the network device control system 11 according to the second embodiment has the same structure as the network device control system 1 of the first embodiment, and conducts the same process as the network device control system 1.

Furthermore, with respect to the network device control system 11 of the second embodiment, there is a variation in which a specific network device out of a plurality of network devices connected to the local area network 17 is activated by detection of the calling state of a telephone call made by the outside telephone 14 with the router 13, without using the NAT (Network Address Translation) technology.

Figure 8:
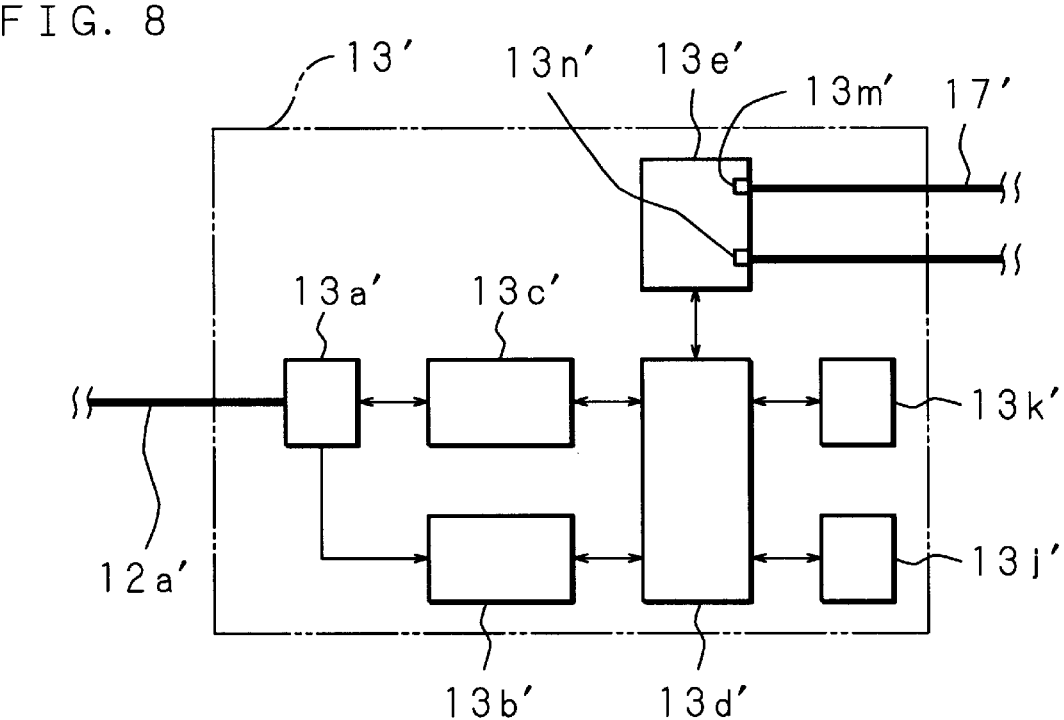
FIG. 8 is an internal structural view of a router according to a variation of the second embodiment.

In this variation of the second embodiment, the system structure itself is the same as the network device control system 11. As shown in FIG. 8, a basic internal structure of a router 13' applied to the system of the variation is the same as the router 3 of the first embodiment shown in FIG. 2. However, a difference in structure is laid in that a counter 13*j*' and a timer 13*k*' are connected to the central control unit 13*d*' in such a manner that various signals can be sent and received. Furthermore, another structural difference between the router 13' and the router 3 is laid in that the network control unit 13*e*' is provided with connection ports 13*m*' and 13*n*' so as to be connected to two signal cable lines of the local area network 17'. However, the router 13' is the same as the router 13 of the second embodiment.

Furthermore, differently from the content of the first embodiment or the like in terms of the operation content, the line monitoring unit 13*b*' detects the calling state of the telephone call when the telephone call is made to the single line 12*a*', that is, a calling frequency corresponding to the number of phone calls received, the calling interval and the calling sound frequency per each calling. Furthermore, central control unit 13*d*' makes it possible to set the calling state, that is, the calling frequency, the calling interval and the calling sound frequency per each calling, for specifying a network device to be activated respectively, and to store these set contents.

The counter 13$j'$ stores the calling sound frequency per each calling. The counter 13$j'$ receives a signal of the calling sound frequency detected by the line monitoring unit 13$b'$ through the central control unit 13$d'$, and stores the frequency. The timer 13$k'$ measures interval time between two calls which come one after another over an elapse of time. The measurement is started with a signal associated with the cutting of the previous call detected by the line monitoring unit 13$b'$ while the measurement is finished with a signal associated with the start of a later call. The central control unit 13$d'$ also reads and resets the stored content in the timer 13$k'$ and the counter 13$j'$.

Furthermore, the central control unit 13$d'$ compares the set calling state and the detected calling state. The central control unit 13$d'$ is configured in such a manner that when the two calling states are identical, a magic packet is sent from the network control unit 13$e'$ to the specific network device. That is, since the central control unit 13$d'$ grasps the local address of each network device in the local area network 17', the local address can be sent to a specific network device by allowing the setting of the calling state of each network device to correspond to the local address of each network device.

In addition, the central control unit 13$d'$ requests the connection via a server of the Internet at the comparison step to send to the outside telephone a global network address of the router 13' given by the server. Furthermore, the central control unit 13$d'$ compares the set calling state and the detected calling state. It is necessary to set in advance the calling state for activation of the system of the variation of the second embodiment. This setting is made from each network device in the local area network 17' connected to the router 13'.

Next, an explanation is given hereinafter on a case where the first network device is activated by a telephone call from the outside telephone to the router 13', in a system of variation of the second embodiment in which the first network device and the second network device are connected to the local area network 17'.

First, a calling state for activation of each of the first network device and second network device is set in the router 13'. For example, for the first network device, the calling frequency is set to two times, the calling interval is set to not more than five seconds between two calls which come one after another, and the calling sound frequency per each calling is set to not less than four times, while for the second network device, the calling frequency is set to three times, the calling interval is set to ten seconds between two calls which come one after another, and the calling sound frequency per each calling is set to not more than three times.

A first time call is made from the outside telephone to a single line 12$a'$, to which the router 13' is connected, on the basis of the setting of the first network device. That is, a first time call is made at a calling sound frequency of the calling state of not less than four times, and then is hung up. Then, a second time call is made from the outside telephone to the router 13' within five seconds from the hanging up of the first time telephone call at a calling sound frequency of not less than four times.

The router 13' judges that the above-mentioned two telephone calls in total are dedicated for activation of the first network device because the two calls agree with the calling state for activation of the first network device, while the router 13' makes connection with the Internet via the server to obtain a global network address. Moreover, e-mail in which the obtained network address is described is sent to the outside telephone, and furthermore, the magic packet for activation is sent to the first network device. The first network device receives the magic packet and is activated. Thereafter, in the same manner as the second embodiment, the device is connected to the outside telephone via the router 13', the server and the like to exchange data in a predetermined operation.

Furthermore, for connection to the second network device, the second device can be activated in differentiation from the first device with only a telephone call in the calling state set for activation of the second network device from the outside telephone. It should be noted that, in the system of the above-mentioned variation, the calling state can be set in a variety of manners. Apart from what is described above, the system of the variation is the same as the system of the second embodiment.

Third Embodiment

Figure 9:
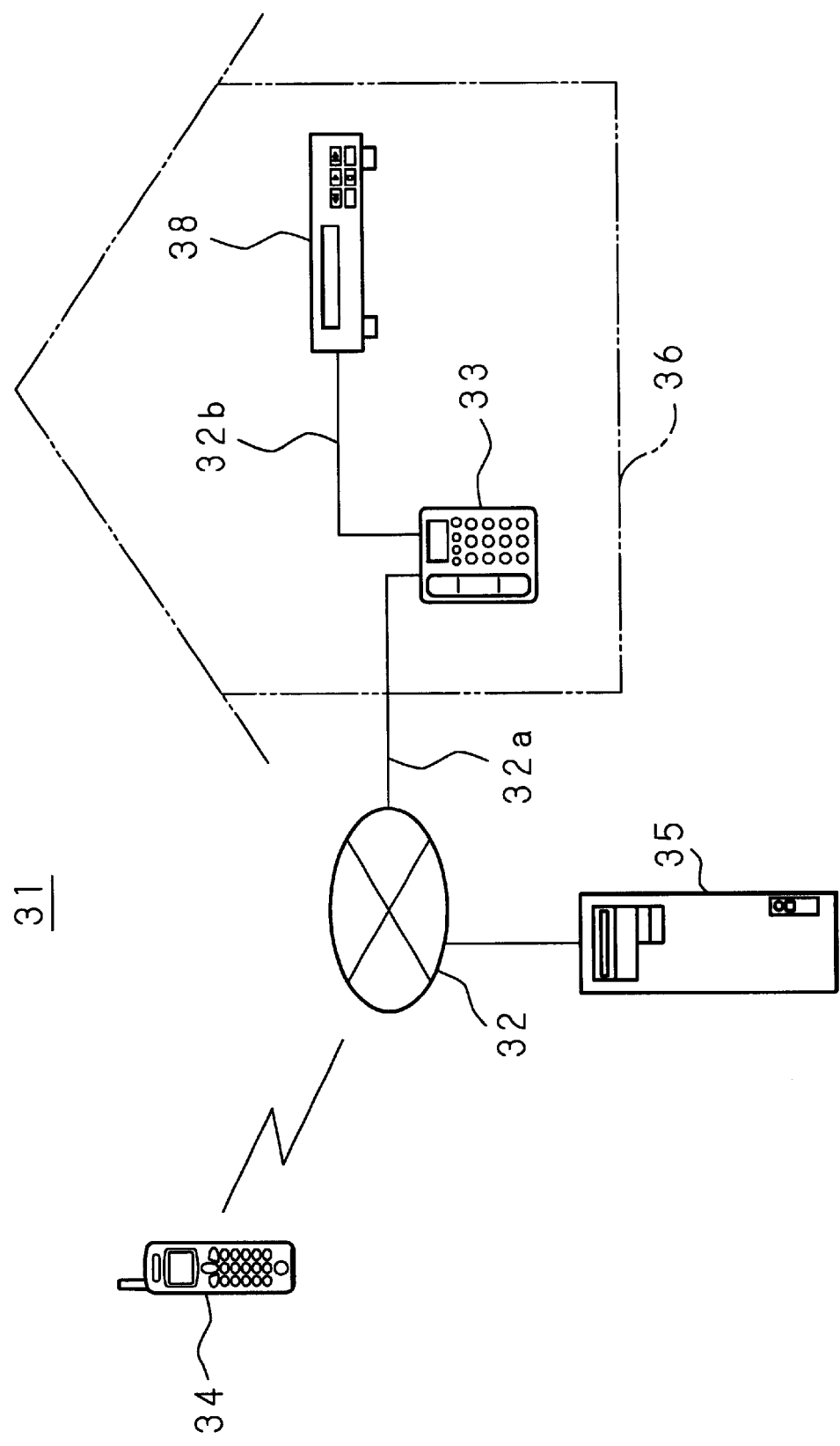
FIG. 9 is a system structural view of a network device control system according to a third embodiment of the present invention.

FIG. 9 is a view showing an overall structure of a network device control system 31 according to a third embodiment of the present invention. The network device control system 31 primarily comprises a video apparatus 38 as an image recording/reproducing apparatus which is a network device that can be connected to the telephone line 32, and an outside telephone 34 which is a communications apparatus.

In the third embodiment, a single line 32$a$ which is a telephone line connected to the telephone line 32 to be given a specific telephone number is introduced into a building 36 and is installed there, and an answering machine provided telephone 33 in the building 36 is connected to this single line 32 while connecting the answering machine provided telephone 33 and the video apparatus 38 via an extension line 32$b$. The video apparatus 38 is therefore connected to the telephone line 32. Furthermore, the server 35 of the network provider of the network which is formed using the telephone line 32 is also connected to the telephone line 32.

On the other hand, the outside telephone 34 belongs to a user of the video apparatus 38. The outside telephone 34 is provided with a function for connecting to the network via the telephone line 32. The outside telephone 34 can be either of the installed type telephone and a portable type telephone which can make a call via the telephone line 32. (FIG. 9 illustrates the portable type telephone.) In addition, as the communications apparatus, an apparatus other than a telephone which enables calling by making a telephone call can be applied. For example, a PDA (Personal Digital Assistant) or the like provided with communications function can be applied.

Figure 10:
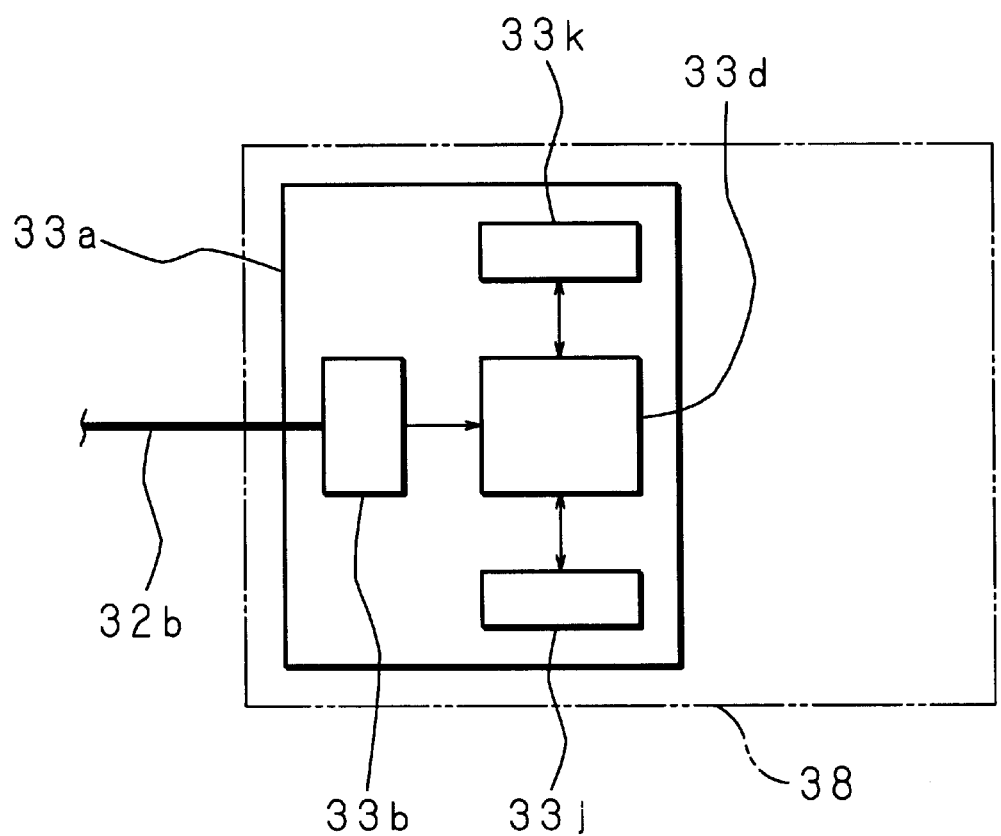
FIG. 10 is a structural view of a calling confirmation unit of an electronic device.

As shown in FIG. 10, the video apparatus 38 incorporates a calling confirmation unit 33$a$ in addition to a normal image recording/reproducing function and the like. Furthermore, the calling confirmation unit 33$a$ comprises a line monitoring unit 33$b$, a counter 33$j$, a timer 33$k$ and a central control unit 33$d$ in a connected state respectively.

The line monitoring unit 33$b$ is means for constantly confirming and detecting a calling state when the outside telephone 34 makes a call to the single line 32, namely, a calling frequency corresponding to the frequency of receipt of the call, a calling interval and a calling sound frequency per each calling. The line monitoring unit 33$b$ enables the single line 32$a$ and the extension line 32$b$ to be connected (in the third embodiment, the extension line 32$b$ is connected). Furthermore, in order to constantly detect a call from the outside, the line monitoring unit 33$b$ is operated with the wait power even when the video apparatus 38 is in the wait state.

The counter 33*j* stores the calling sound frequency per each calling. The counter 33*j* receives the signal of the calling sound frequency detected by the line monitoring unit 33*b* via the central control unit 33*d* and stores the contents. The timer 33*k* measures a calling interval time between two calls which come one after another. The timer 33*k* starts the measurement by a signal associated with the hanging up of the previous call detected by the line monitoring unit 33*b* and finishes the measurement by a signal associated with the start of the later call.

The central control unit 33*d* makes it possible to respectively set a calling frequency, a calling interval, and a calling sound frequency per each calling as a calling state for activation of the video apparatus 38 and stores the set content. Moreover, the central control unit 33*d* reads and resets the stored content in the timer 33*k* and the counter 33*j*. Furthermore, the central control unit 33*d* compares the set calling interval with the stored content in the timer 33*k*, and the set calling sound frequency with the stored content in the counter 33*j* respectively, and controls the entire video apparatus 38 to be activated when each item of the set contents and each item in the calling state generated by the outside telephone 34 are all the same. Furthermore, the central control unit 33*d* is configured so as to store the telephone number or address of the outside telephone 34 which has made a call, when it is judged that the two items are identical.

In addition, since the central control unit 33*d* compares the calling state generated by the outside telephone 34 with the set calling state, it is necessary to set in advance the calling state at the time of activation of the system according to the present invention. The calling state is set by setting buttons provided at the video apparatus 38 or a remote controller of the video apparatus 38.

Furthermore, after the central control unit 33*d* is activated, the central control unit 33*d* notifies to the outside telephone 34 which is a calling device by e-mail the fact that the system has been activated. This notification is made via the server 15 of the network provider which manages the network that is formed using the telephone line 32. In addition, after the above notification, the central control unit 33*d* has a function of sending and receiving various control signals associated with the time controlled image recording or the like via the outside telephone 34 and the network.

It should be noted that, in the third embodiment, as shown in FIG. 9, since the answering machine provided telephone 33 exists in front of the video apparatus 38 with respect to the telephone line 32, it is assumed that there arises a state in which the answering machine function of the answering machine provided telephone 33 is activated in advance in response to the call from the outside telephone 34, and the video apparatus 38 cannot confirm the call. Consequently, in order to avoid such circumstances, the frequency of the calling sound per each calling set for the video apparatus 38 is set to a frequency smaller than the calling sound frequency for activating the answering machine function.

Next, actual usage forms of the network device control system 31 according to the present invention will be explained in detail on the basis of the flowchart shown in FIGS. 11 and 12. It should be noted that "X" and "Y" in FIG. 11 have meanings to be continued to "X" and "Y" in FIG. 12.

First, with respect to the video apparatus 38, a calling state for activation is set in advance. For example, the calling frequency is set to two times, the calling interval is set to 10 sec, the calling sound frequency for the first time call is set to five times, and the calling sound frequency for the second time call is set to three times. Furthermore, after the setting, the video apparatus 38 is set in the wait state where only the calling confirmation unit 33*a* is activated, and waits for the first time telephone call (S31).

Next, in order to activate the video apparatus 38, a call is made through the phone call from the outside telephone 34 to the specific single line 32*a* to which the video apparatus 38 is connected (S32). Herein, the first time call is made with the calling sound frequency of five times, in agreement with the set calling state. The first time call from the telephone line 32 is received by the line monitoring unit 33*b* in the wait state in the video apparatus 38 via the single line 32*a*, the answering machine provided telephone 33 and the extension line 32*b* as shown in FIG. 9 (S33). The calling sound frequency detected during the receiving of the call is sent to the counter 33*j* via the central control unit 33*d* so that the counter 33*j* counts the calling sound frequency (see FIG. 10). That is, since the calling sound frequency for the first time call is five times, the counter number of the counter 33*j* becomes "5".

Furthermore, after the five time calling sound is completed, the line monitoring unit 33*b* also sends to the central control unit 33*d* a signal indicating that the first time call is disconnected. The central control unit 33*d*, upon receipt of the disconnection signal, compares the content of the counter 33*j* with the calling sound frequency associated with the set first time call (S34). In this case, since both are identical, the central control unit 33*d* judges that the process associated with activation should be continued to reset the numeric value in the counter 33*j* to "0" while allowing the timer 33*k* to start the measurement of time from the time at which the first time call is received up to the second time call so that the video apparatus 38 is set in the wait state for the second time call (S35).

On the other hand, the outside telephone 34, which has completed the first time call, makes the second time call at a calling sound frequency of three times ten seconds after disconnection of the first time call, in accordance with the calling state which is set for the video apparatus 38 (S36).

The second time call is also received by the line monitoring unit 33*b* of the video apparatus 38 (S37). When the line monitoring unit 33*b* detects the second time call through receiving of the call, a detection signal of the second time call is sent to the central control unit 33*d*. The central control unit 33*d* receives the signal, instructs the timer 33*k* to complete the time measurement and compares the time measured by the timer 33*k* with the time set in the central control unit 33*d*. In this case, since the contents to be compared are identical, the central control unit 33*d* resets the numeric value in the timer 33*k* to provide "0" to prepare for the next measurement while the comparison process associated with the second time calling sound frequency is subsequently conducted.

Since the calling sound frequency associated with the second time call is three times, the counter number in the counter 33*j* is also "3". The line monitoring unit 33*b* sends the disconnection signal of the second time call to the central control unit 33*d*. The central control unit 33*d* receives the signal and compares the content of the counter 33*j* with the set calling sound frequency for the second time call (S38). In this case, since both are identical, the central control unit 33*d* judges that all the set calling states are identical with the actually received calling state and activates the video apparatus 38 (S39). In this manner, since the video apparatus 38 is activated by making use of the calling state through the telephone call in the state before the single line 32*a* is connected as a circuit, no telephone costs are generated in activation of the video apparatus 38.

In addition to the activation operation described above, the central control unit 33*d* resets the numeric value in the counter 33*j* in preparation for the next time call, while identifying that the call associated with such an activation is made by the telephone 34 belonging to the user of the video apparatus 38 and also storing the telephone number of the telephone 34 which is the identified calling device.

Figure 12:
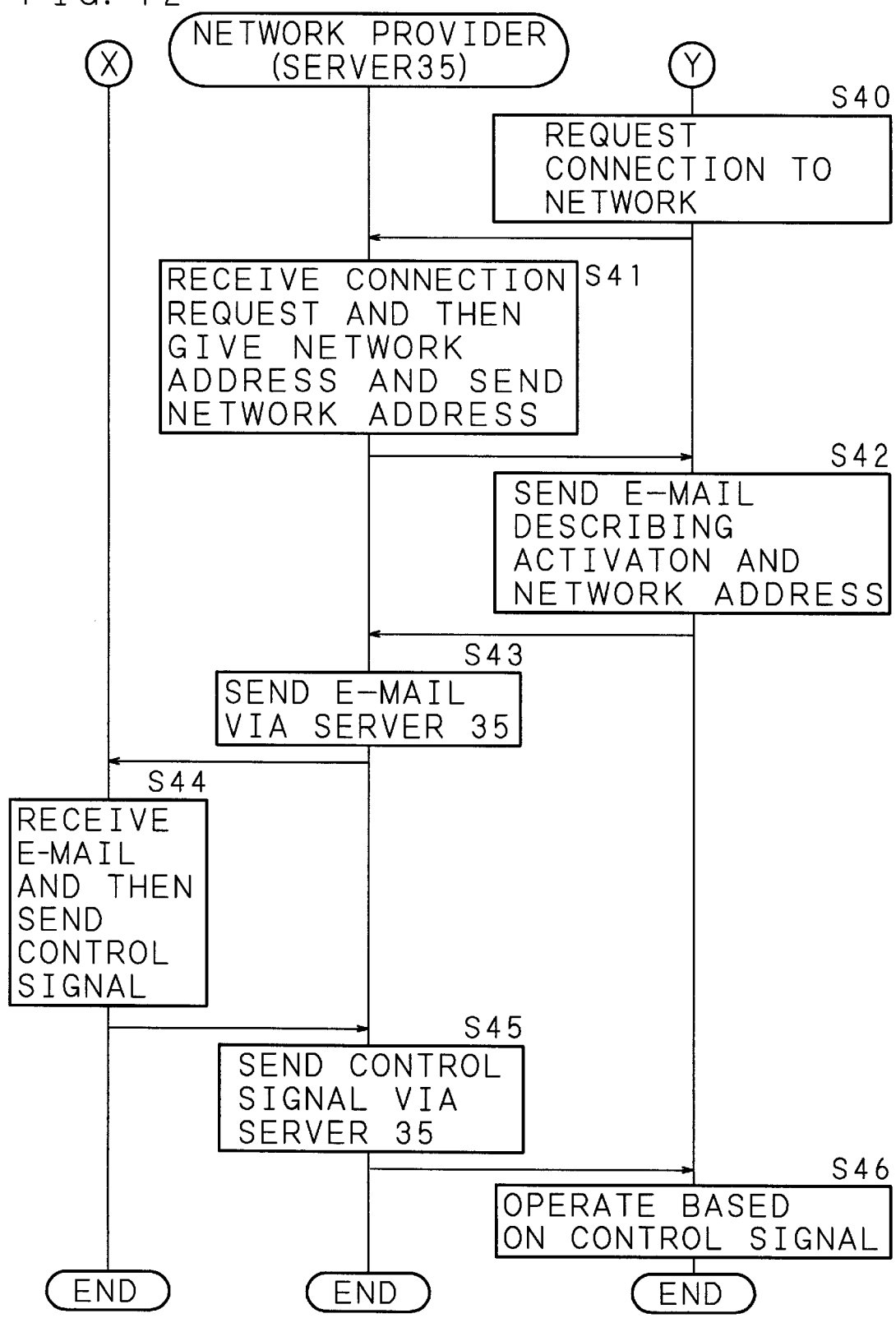
FIG. 12 is a flowchart showing the procedure from a request for connection to the network up to operation based on the control signal.

In the above-mentioned identification, the central control unit 33*d* conducts process of notifying to the telephone 34 the fact that the video apparatus 38 has been activated along the flowchart of FIG. 12. Specifically, the central control unit 33*d* requests to the server 35 of the network provider via the telephone line 32 a connection to the network formed by the telephone line 32 (S40). The server 35 which receives the request receives the connection to the network of the video apparatus 38, gives a unique network address to the video apparatus 38 and sends the address to the central control unit 33*d* of the video apparatus 38 (S41).

The central control unit 33*d* which has received the network address sends an e-mail in which the fact that the video apparatus 38 has been activated and the network address are described, to the outside telephone 34 in accordance with the telephone number which is stored (S42). Furthermore, the e-mail which has been sent is sent to the outside telephone 34 via the server 35 (S43).

On receiving the e-mail, the outside telephone 34 can obtain information that the video apparatus 38 has been activated, and the network address of the video apparatus 38. Thereafter, the telephone 34 is connected with the video apparatus 38, which is the network address destination, via the server 35 of this network to send various control signals associated with the time controlled image recording or the like (S44). Various control signals that are sent are sent to the video apparatus 38 via the server 35 (S45), so that the video apparatus 38 conducts operations associated with the time controlled image recording or the like on the basis of various control signals (S46). In addition, depending on the content for operating the video apparatus 38, the content of S44 through S46 is conducted a plurality of times in some cases. Furthermore, a confirmation signal with respect to the operation or the like is sent from the video apparatus 38 to the outside telephone 34 is some cases.

Furthermore, in the process described above, in a case where the calling state generated by the outside telephone 34 differs from the set state for the video apparatus 38, the following process is conducted in the following manner in accordance with each step. That is, as shown in the flowchart of FIG. 11, when the calling sound frequency associated with the first time call is the number of times other than five times, the central control unit 33*d* judges that the calling sound frequency is different in comparison with the counter 33*j* (S34), to reset the detected content of the counter 33*j* and to be set in the wait state for the first time call (S47).

Furthermore, in a case where the calling sound frequency associated with the first time call is identical but time from disconnection of the first time call up to receiving of the second time call is different from the set time, or in a case where the calling sound frequency for the second time call is different from the setting, the central control unit 33*d* resets the detected content of the timer 33*k* or the content of the counter 33*j* at the second time comparison step (S38) and is then set in the wait state for the first time call (S48).

It should be noted that the set state at the central control unit 33*d* is not limited to the setting described above. Except for the restriction such that the calling sound frequency associated with the call is smaller than the calling sound frequency for starting the answering machine function in the answering machine provided telephone 33, the set state can be appropriately defined. For example, it is possible to set the calling state in the following manner; the calling frequency is set to three times, the calling interval is set to five seconds, the calling sound frequency of the first time call is set to six times, the calling sound frequency of the second time call is set to three times, and the calling sound frequency of the third time call is set to five times.

Furthermore, in stead of the setting such that the calling interval and the calling sound frequency of each calling is identical with a definite numeric value, it is possible to define the setting of not less than a given number of seconds or not more than a given number of seconds, and not less than a given number of times or not more than a given number of times. Specifically, it is possible to define the setting of calling frequency to two times, calling interval of not more than ten seconds, five times for the first time calling sound frequency, and not more than five times for the second time calling sound frequency. Through such setting, it is possible to alleviate a burden of operation due to the requirement for the call at the time of making a telephone call from the outside telephone 34.

Furthermore, with respect to such a setting of the calling frequency once and the calling interval 0 seconds, it is possible to activate the video apparatus 38 with one time call. However, in this case, it is assumed that the video apparatus 38 may be activated by a wrong number call. It is required to carefully set frequency of the calling sound frequency. In addition, no special operation is demanded at the time of making a telephone call to the answering machine provided telephone 33 of the network device control system 31 from the outside. Furthermore, since the answering machine function can be activated when a calling sound frequency exceeds a defined number, the same usage as in the conventional manner can be maintained with respect to the answering machine provided telephone 33, so that no special function is requested to the answering machine provided telephone 33.

Furthermore, with respect to the network device control system 31 according to the third embodiment, a variety of variations can be made besides the above-mentioned variation. For example, to the single line 32*a* introduced from the telephone line 32, a telephone line connection apparatus such as a facsimile machine and a modem or a telephone without an answering machine function can be connected instead of the answering machine provided telephone 33. Moreover, the video apparatus 38 may be directly connected to the single line 32*a*. Herein, in a case where a facsimile machine, a modem or the like is connected, the calling sound frequency per each calling is set at a frequency smaller than the calling sound frequency associated with the receipt activation of the facsimile machine or the like, in the same manner as in the case of the answering machine provided telephone 33. Furthermore, the kind of network devices applicable to the system according to the present invention include, in addition to the video apparatus 38, electronic devices such as an air conditioner, a refrigerator, a rice cooking device, an automatic bath such as a bath preparing apparatus and a bath water heating apparatus, and a sound recording/reproducing apparatus, and information-processing equipment such as a computer, which are provided with a calling confirmation unit 33*a* shown in FIG. 10.

On the other hand, for notifying the fact that the device has been activated to the outside telephone 34, the telephone signal via the telephone line 32 may be utilized which does not pass through the server 35 of the network. In this case, various control signals associated with succeeding operations of the network device are sent and received via the telephone line.

Fourth Embodiment

Figure 13:
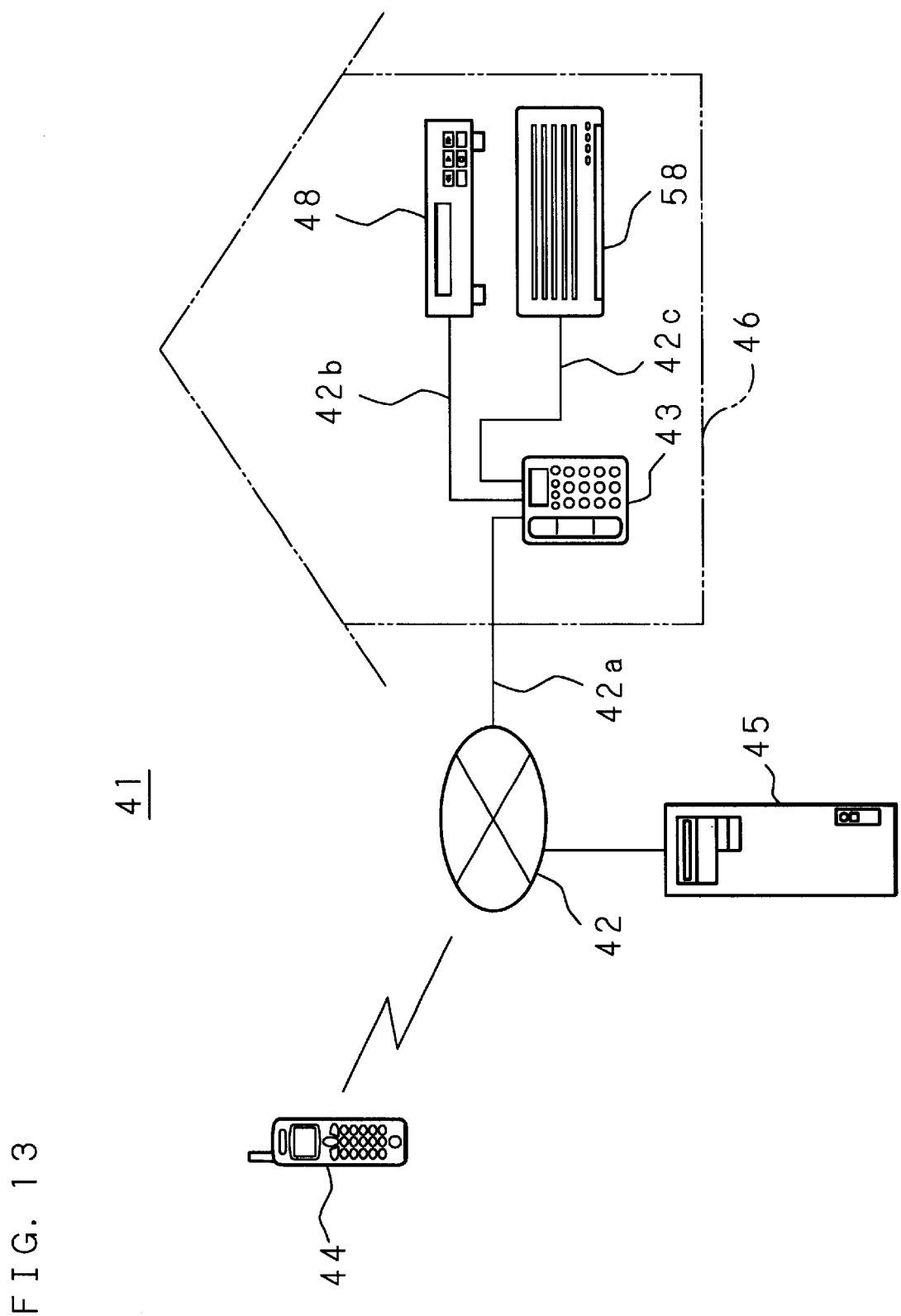
FIG. 13 is a system structural view of a network device control system according to a fourth embodiment of the present invention.

FIG. 13 is a view showing an overall structural view of a network device control system 41 according to a fourth embodiment of the present invention. FIG. 13 illustrates a case where a video apparatus 48, and an air conditioner 58 as network devices which can be connected as a circuit are respectively connected to a first extension line 42b and a second extension line 42c which are branched off from the single line 42a of the identical calling system. The network device control system 41 of the fourth embodiment has the same system structure as that of the network device control system 31 according to the third embodiment except for the fact that such a video apparatus 48 and an air conditioner 58 are connected. An answering machine provided telephone 43 is connected to a specific single line 42a which is introduced from the telephone line 42 into the building 46 to activate either the video apparatus 48 or the air conditioner 58 from the outside telephone 44. Furthermore, the server 45 of the network provider of the network using the telephone 42 is also connected to the telephone line 42.

The video apparatus 48 and air conditioner 58 are provided with a unit corresponding to the calling confirmation unit 33a shown in FIG. 10 in the same manner as the video apparatus 38 of the third embodiment. The calling state is set in a different manner for the video apparatus 48 and for the air conditioner 58. For example, a calling state for the video apparatus 48 is set in the following manner; the calling frequency is set to two times, the calling interval is set to ten seconds, the first time calling sound frequency is set to five times, and the calling sound frequency of the second time call is set to seven times. A calling state for the air conditioner 58 is set in the following manner; the calling frequency is set to three times, each of the calling intervals is set to five seconds, the calling sound frequency of the first time call is set to six times, the calling sound frequency of the second time call is set to eight times, and the calling sound frequency of the third time call is set to six times. Herein, the fourth embodiment is the same as the third embodiment in that the calling sound frequency set for each call is set so as not to exceed the calling sound frequency for starting the answering machine function of the answering machine provided telephone 43.

Figure 11:
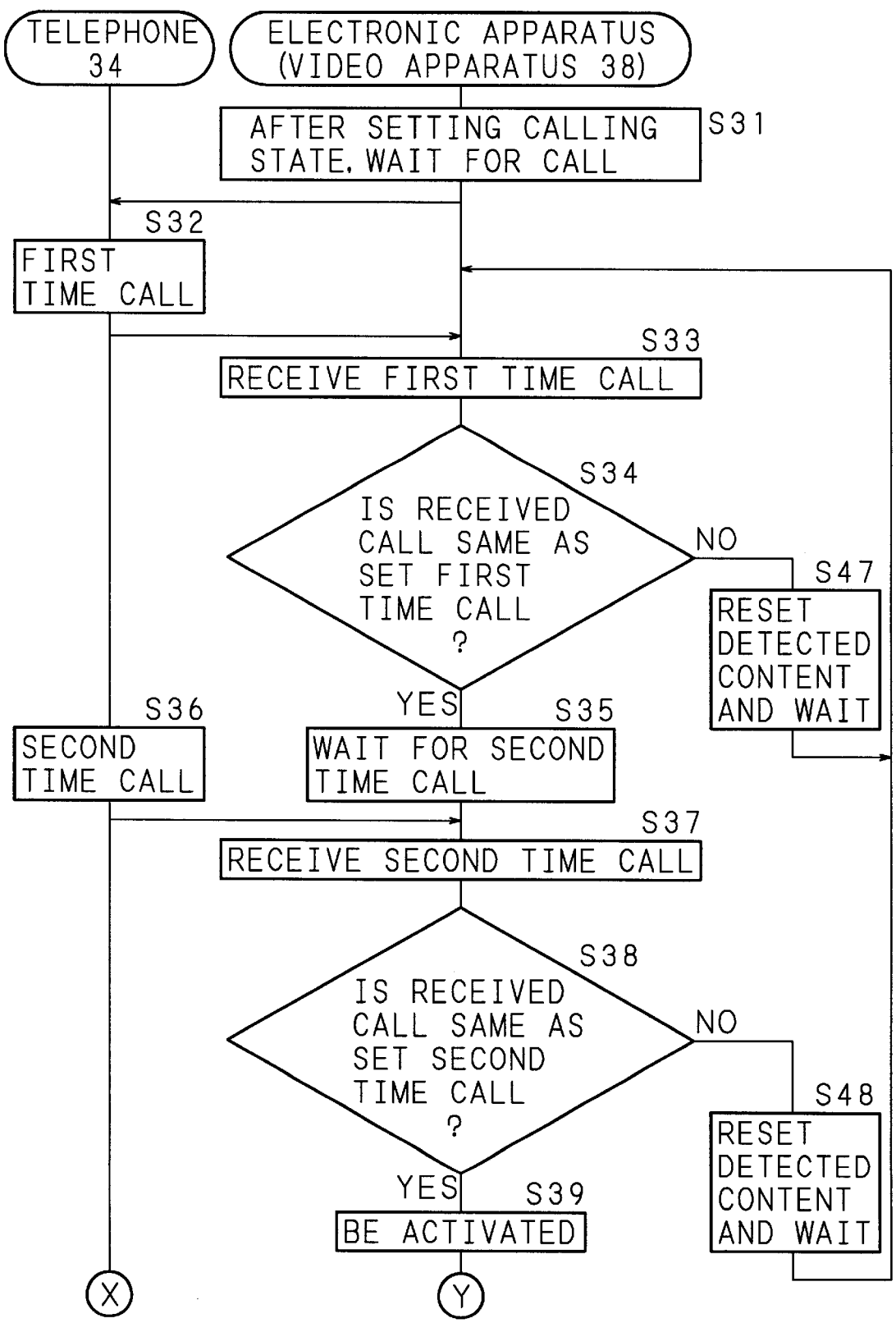
FIG. 11 is a flowchart showing the procedure from a setting of a calling state up to activation of the electronic device.

The activation of the video apparatus 48 and air conditioner 58 with the outside telephone 44 is a process basically conducted in accordance with the flowcharts of FIGS. 11 and 12 associated with the third embodiment. In order to activate the video apparatus 48, a call is required on the basis of the setting unique to the video apparatus 48. In order to activate the air conditioner 58, a call is required on the basis of the setting unique to the air conditioner 58.

On the basis of the setting example described above, an explanation is given on a case where the video apparatus 48 is activated in a differentiation from the air conditioner 58 with a call from the outside telephone 44.

First, a first time call is made from the telephone 44 to the single line 42a to have the calling sound frequency of five times. The video apparatus 48 which receives and detects this call judges that the calling sound frequency in the first time call is identical with the set state and is then set in the wait state for the second time call.

On the other hand, the air conditioner 58 also receives and detects the above-mentioned call. However, when the air conditioner 58 detects the five time calling sound frequency, the air conditioner 58 judges that the calling sound frequency is not identical with the set first time content and is then set in the wait state of a new first time call.

Next, in a case where a second time call is made from the outside telephone 44 to the single line 42a with a seven time calling sound ten seconds after disconnection of the first time call, the video apparatus 48 detects that the interval time between the first time call and the second time call is ten seconds and that the calling sound frequency for the second time call is seven times, and the video apparatus 48 judges that the frequency and the interval are identical with the set state. Consequently, the video apparatus 48 is activated. Thereafter, in the same manner as the third embodiment, the video apparatus 48 notifies the activation thereof to the outside telephone 44, and a control signal or the like is sent and received between the telephone 44 and video apparatus 48.

On the other hand, the second time call from the telephone 44 described above is received and detected as a first time call by the air conditioner 58. However, since the second time call is different from the set state of the first time calling sound frequency for the air conditioner 58, the air conditioner 58 judges that the call is not a call for activation and is then set in the wait state for a new first time call. In addition, except for what has been described above, the structure and the process are conducted the same as the third embodiment.

As described above, in the network device control system 41 of the fourth embodiment, even when a plurality of network devices are connected to a line of the identical calling system, an intended network device can be activated in a differentiated manner with certainty by making a call unique to individual network device from the outside telephone 44. Consequently, even in a case where the number of network devices to be connected is larger than two, each of the network devices can be activated in a differentiated manner with certainty by defining different settings for each of the network devices.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A network device control system for controlling an operation of a network device included in a local area network having a network interconnection apparatus via the network interconnection apparatus with a communications apparatus outside the local area network, wherein the network interconnection apparatus comprises:

a connection unit connected to a telephone line;

a detection unit for detecting a calling state generated by the communications apparatus via the telephone line; and a signal sending unit for sending a signal to the network device when the calling state is detected.

2. The network device control system according to claim 1, wherein the signal is a packet signal for activating the network device which is in a wait state.

3. The network device control system according to claim 2, wherein the network interconnection apparatus connects the local area network and another local area network, the another local area network includes a network management apparatus, the network device is capable of performing operations of:

requesting the network management apparatus to give an address for identifying a location of the network device based on the another local area network, when the network device is activated; and sending the notified address to the communications apparatus, and the network interconnection apparatus further comprises an address notification unit for notifying the given address from the network management apparatus to the network device.

4. A network device control system for controlling an operation of a network device included in a local area network having a network interconnection apparatus via the network interconnection apparatus with a communications apparatus outside the local area network, wherein the network interconnection apparatus comprises:

a connection unit connected to a telephone line;

a detection unit for detecting a calling state generated by the communications apparatus via the telephone line;

a display instruction unit for displaying on the communications apparatus a menu screen on which the network device is displayed when the calling state is detected, so that a network device can be selected as a control target out of displayed network devices; and a signal sending unit for sending a signal to the selected network device when the network device is selected.

5. The network device control system according to claim 4, wherein the network interconnection apparatus connects the local area network and another local area network, the another local area network includes a network management apparatus, and the network interconnection apparatus further comprises:

an address requesting unit for requesting the network management apparatus to give an address for specifying a location of the network interconnection apparatus based on the another local area network when the calling state is detected;

an address receiving unit for receiving the given address from the network management apparatus; and an address sending unit for sending the received address to the communications apparatus.

6. A network device control system for controlling an operation of a network device included in a local area network having a network interconnection apparatus via the network interconnection apparatus with a communications apparatus outside the local area network, wherein the network interconnection apparatus comprises:

a connection unit connected to a telephone line;

a detection unit for detecting a calling state generated by the communications apparatus via the telephone line;

a storing unit for storing a set calling state;

a comparison unit for comparing the calling state detected by the detection unit and the calling state stored in the storing unit; and a signal sending unit for sending a signal to the network device when the comparison result indicates that the two calling states are identical.

7. The network device control system according to claim 6, wherein the network interconnection apparatus connects the local area network and another local area network, the another local area network includes a network management apparatus, and the network interconnection apparatus further comprises:

an address requesting unit for requesting the network management apparatus to give an address for identifying a location of the network interconnection apparatus based on the another local area network when the comparison result indicates that the two calling states are identical;

an address receiving unit for receiving the given address from the network management apparatus; and an address sending unit for sending the received address to the communications apparatus.

8. The network device control system according to claim 6, wherein a plurality of network devices are provided, the storing unit can store calling states which are stored in a different manner for each of the network devices, and the signal sending unit sends the signal to a network device, for which a calling state identical with the detected calling state is set, when the comparison result indicates that the two calling states are identical.

9. A network device control system for activating a network device connected to a telephone line with an outside communications apparatus, wherein the network device comprises:

a detection unit for detecting a calling state generated by the communications apparatus;

a storing unit for storing a set calling state;

a comparison unit for comparing the calling state detected by the detection unit and the calling state stored in the storing unit; and an activation unit for activating the network device when the comparison result indicates that the two calling states are identical.

10. The network device control system according to claim 9, wherein each of the calling states includes a calling frequency, a calling interval and a calling sound frequency per each calling.

11. The network device control system according to claim 10, wherein the network device is connected to the telephone line via one of an answering machine provided telephone, a facsimile machine and a telephone line connection apparatus, and the calling sound frequency stored in the storing unit is set at a frequency smaller than a calling sound frequency for allowing a function for a call of the one of the answering machine provided telephone, facsimile machine and telephone line connection apparatus to start operating.

12. The network device control system according to claim 9, wherein the network device further comprises an activation notification unit for notifying activation to the communications apparatus when the network device is activated by a call from the communications apparatus.

13. The network device control system according to claim 9, wherein a plurality of network devices are provided, the plurality of network devices are connected to a line of an identical calling system of the telephone line, and the calling state of each network device is set in different manners respectively.

14. A network interconnection apparatus which enables connection of a plurality of networks, comprising:

a connection unit connected to a telephone line;

a detection unit for detecting a calling state generated by a communications apparatus via the telephone line; and a signal output unit for outputting a signal to the outside via the network when the calling state is detected.

15. The network interconnection apparatus according to claim 14, further comprising an address output unit for outputting an address for identifying a location of an output target of the signal based on the network to the output target of the signal via the network.

16. The network interconnection apparatus according to claim 14, further comprising:

an address requesting unit for requesting the network to give an address for identifying a location thereof based on the network when the calling state is detected;

an address receiving unit for receiving the given address from the network; and an address output unit for outputting the received address to a calling device of the calling state via the network.

17. The network interconnection apparatus according to claim 14, further comprising a display instruction unit for displaying on a calling device of the calling state a menu screen on which an output target of the signal is displayed when the calling state is detected so that an output target can be selected out of displayed output targets, wherein the signal output unit, when an output target is selected, outputs the signal to the selected output target.

18. A network interconnection apparatus which enables connection of a plurality of networks, comprising:

a connection unit connected to a telephone line;

a detection unit for detecting a calling state generated from the outside via the telephone line;

a storing unit for storing a set calling state;

a comparison unit for comparing the calling state detected by the detection unit and the calling state stored in the storing unit; and a signal output unit for outputting a signal to the outside via the network when the comparison result indicates that the two calling states are identical.

19. The network interconnection apparatus according to claim 18, further comprising:

an address requesting unit for requesting the network to give an address for identifying a location thereof based on the network when the comparison result indicates that the two calling states are identical;

an address receiving unit for receiving the given address from the network; and an address output unit for outputting the received address to a calling device of the calling state via the network.

20. The network interconnection apparatus according to claim 18, wherein the storing unit can store a calling state set in different manners for each of the plurality of output targets to which signals are outputted, and the signal output unit outputs the signal to an output target, for which a calling state identical with the detected calling state is set, when the comparison result indicates that the two calling states are identical.

21. A network device which can be connected to a telephone line, comprising:

a detection unit for detecting a calling state generated by an outside communications apparatus via the telephone line;

a storing unit for storing a set calling state;

a comparison unit for comparing the calling state detected by the detection unit and the calling sate stored in the storing unit; and an activation instruction unit for activating the network device when the comparison result indicates that the two calling states are identical.

22. The network device according to claim 21, wherein each of the calling states includes a calling frequency, a calling interval, and a calling sound frequency per each calling.

23. The network device according to claim 21, further comprising an activation notification unit for notifying activation to a communications apparatus when the network device is activated by a call from the communications apparatus.

24. A network device control system for controlling an operation of a network device included in a local area network having a network interconnection apparatus via the network interconnection apparatus with a communications apparatus outside the local area network, wherein the network interconnection apparatus comprises:

connection means connected to a telephone line;

means for detecting a calling state generated by the communications apparatus via the telephone line; and means for sending a signal to the network device when the calling state is detected.

25. A network interconnection apparatus which enables connection of a plurality of networks, comprising:

connection means connected to a telephone line;

means for detecting a calling state generated by a communications apparatus via the telephone line; and means for outputting a signal to the outside via the network when the calling state is detected.

26. A network device which can be connected to a telephone line, comprising:

detection means for detecting a calling state generated by an outside communications apparatus via the telephone line;

storing means for storing a set calling state;

means for comparing the calling state detected by the detection means and the calling sate stored in the storing means; and means for activating the network device when the comparison result indicates that the two calling states are identical.

* * * * *